United States Patent
Kato et al.

(10) Patent No.: US 8,582,199 B2
(45) Date of Patent: Nov. 12, 2013

(54) ELECTROPHORETIC COMPOSITION, MICROCAPSULE AND ELECTROPHORETIC DISPLAY DEVICE

(71) Applicant: Fujifilm Corporation, Tokyo (JP)

(72) Inventors: Takashi Kato, Minami-Ashigara (JP); Yasuhiro Ishiwata, Minami-Ashigara (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 13/676,093

(22) Filed: Nov. 14, 2012

(65) Prior Publication Data
US 2013/0155489 A1  Jun. 20, 2013

(30) Foreign Application Priority Data
Dec. 15, 2011 (JP) ................................. 2011-274930

(51) Int. Cl.
*G02B 26/00* (2006.01)
(52) U.S. Cl.
USPC .......................................................... 359/296
(58) Field of Classification Search
USPC .......................................................... 359/296
See application file for complete search history.

(56) References Cited

U.S. PATENT DOCUMENTS

2012/0088307 A1*  4/2012  Singh et al. .................... 436/86

FOREIGN PATENT DOCUMENTS

| JP | 50-15115 B | 6/1975 |
| JP | 50-15119 B | 6/1975 |
| JP | 2010-525122 A | 7/2010 |
| JP | 2010-534746 A | 11/2010 |
| WO | 2005/017046 A2 | 2/2005 |

* cited by examiner

*Primary Examiner* — James Jones
(74) *Attorney, Agent, or Firm* — SOLARIS Intellectual Property Group, PLLC

(57) ABSTRACT

Disclosed is an electrophoretic composition including a dye, a non-water-soluble dispersion medium, and charged particles, wherein the dye includes in a molecule thereof at least two color forming moieties including a first color forming moiety and a second color forming moiety, the first color forming moiety having a maximum absorption wavelength that is the shortest maximum absorption wavelength among the at least two color forming moieties, the second color forming moiety having a maximum absorption wavelength that is the longest maximum absorption wavelength among the at least two color forming moieties, a difference between the maximum absorption wavelength of the first color forming moiety and the maximum absorption wavelength of the second color forming moiety being from 50 nm to 400 nm, and the first color forming moiety and the second color forming moiety being bonded through a covalent bond.

19 Claims, 1 Drawing Sheet

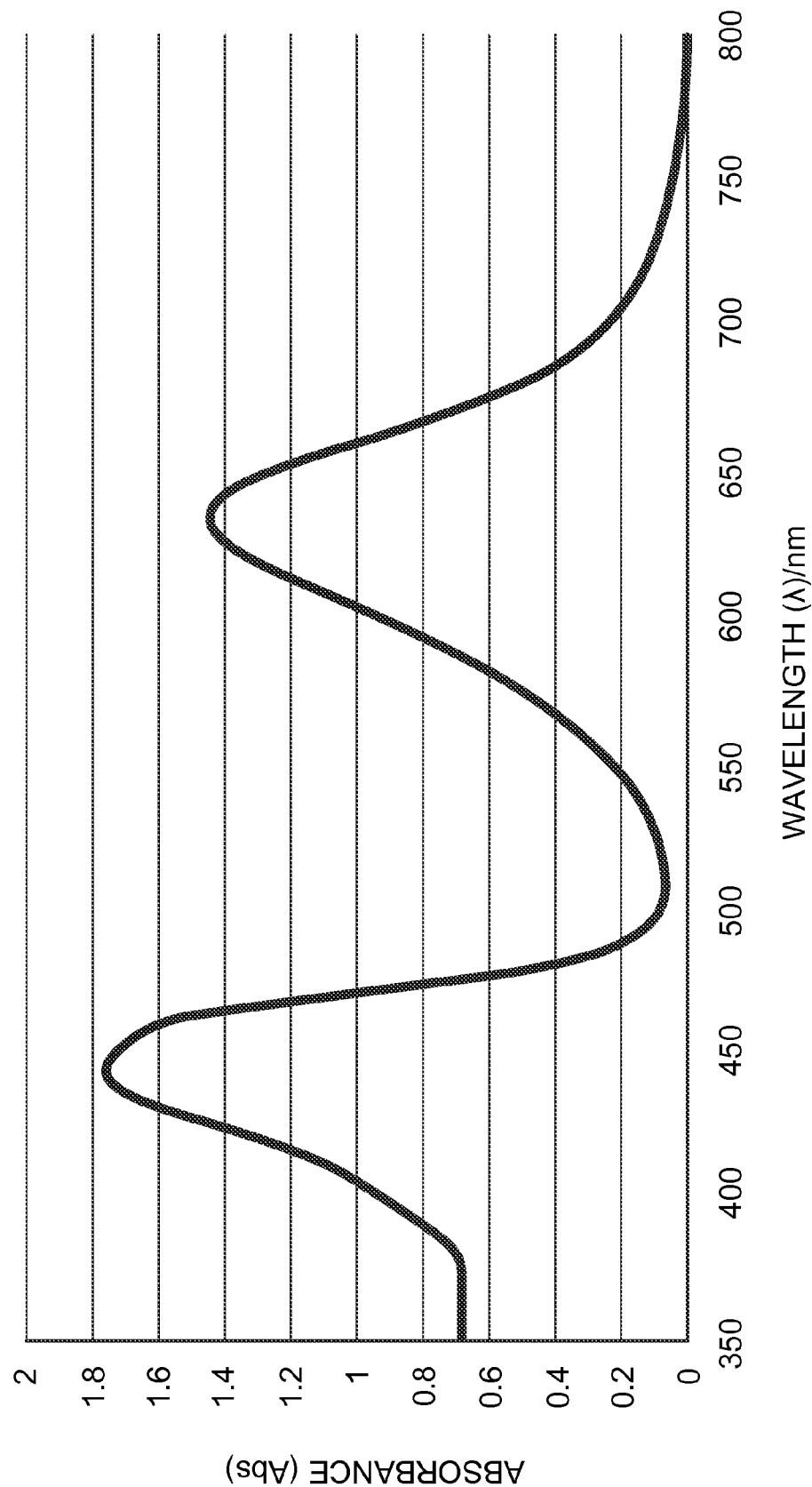

ELECTROPHORETIC COMPOSITION, MICROCAPSULE AND ELECTROPHORETIC DISPLAY DEVICE

CROSS-REFERENCE TO RELATED APPLICATION

This application claims priority under 35 USC 119 from Japanese Patent Application Nos. 2011-274930, filed on Dec. 15, 2011, the disclosure of which is incorporated by reference herein.

BACKGROUND OF THE INVENTION

1. Technical Field

The present invention relates to an electrophoretic composition, a microcapsule and an electrophoretic display device.

2. Description of the Related Art

In recent years, in the advanced information society due to development of, for example, internet, cellular phones, and interactive televisions, needs for high quality thin display devices which require less consumption power have been growing. Among these devices, liquid crystal display devices employ a displaying principle in which liquid crystal molecule alignment is electrically controlled whereby to change optical characteristics is employed. In this situation, liquid crystal display devices have been actively researched and developed as display devices which can address the needs, and have been commercialized.

However, in most of liquid crystal display devices, transmission of light entered to the liquid crystal from a light source (back light) disposed at the back side is controlled, whereby images are displayed. Accordingly, in a well-lighted area, there is difficulty in viewing the images. Further, since it is necessary to always keep the light on, satisfactorily less power consumption is also an issue.

Studies on display devices to solve these issues have been actively made. For example, electrophoretic display devices are known (see, for example, Examined Japanese Published Examined Application Nos. 50-15115 and 50-15119). Such electrophoretic display devices include a pair of substrates which are disposed to have a gap therebetween and each substrate of the pair of substrate has an electrode that is an electrically conductive layer, the electrically conductive layer on at least one of the substrates being transparent. In the gap between the substrates, many charged and colored electrophoretic particles and a dispersion medium which has a different color from that of the electrophoretic particles are placed. Alternatively, there are devices in which two or more kinds of electrophoretic particles which are different from one another in a charged polarity and/or color, and a colorless dispersion medium are placed between the two substrates.

In such electrophoretic display devices, when negative voltage is applied to one electrode and positive voltage is applied to the other electrode, positively charged electrophoretic particles move toward the negative electrode so as to coat the negative electrode. When viewing the display device from the negative electrode side, the color of the electrophoretic particles can be seen. When the voltage applied to each of the electrodes is reversed, the color of the colored dispersion medium or another kind of electrophoretic particles can be seen. When such a voltage driving is carried out on a pixel basis of a number of arranged pixels, any images and characters can be displayed.

A study on the color display using a transparent colored-dispersion medium obtained by adding a dye to a dispersant has been carried out (for example, Japanese Application National Phase Publication No. 2010-525122 and International Publication WO 2005/017046 A2).

In the field of thermal lithographic offset printing, an overcoat composition including a water-soluble polymer dye having an absorption band of from 300 nm to 600 nm has been disclosed (see, for example, Japanese Application National Phase Publication No. 2010-534746).

SUMMARY OF INVENTION

Technical Problem

In the electrophoretic display devices described in Examined Japanese Published Examined Application Nos. 50-15115 and 50-15119, Japanese Application National Phase Publication No. 2010-525122 or International Publication WO 2005/017046 A2, however, sufficient transparency has not been attained due to, for example, occurrence of color irregularity and insufficient color reproduction. Further, it is difficult to use the composition described in Japanese Application National Phase Publication No. 2010-534746 in the field of electrophoretic display devices.

The technical problem to be solved by the present invention is to provide an electrophoretic composition and a microcapsule which has excellent transparency, and an electrophoretic display device which has excellent color reproducibility.

Solution to Problem

The present invention is to solve the above described technical problem and includes the following aspects.

<1> An electrophoretic composition including a dye, a non-water-soluble dispersion medium, and charged particles, wherein the dye includes in a molecule thereof at least two color forming moieties including a first color forming moiety and a second color forming moiety, the first color forming moiety having a maximum absorption wavelength that is the shortest maximum absorption wavelength among the at least two color forming moieties, the second color forming moiety having a maximum absorption wavelength that is the longest maximum absorption wavelength among the at least two color forming moieties, a difference between the maximum absorption wavelength of the first color forming moiety and the maximum absorption wavelength of the second color forming moiety being from 50 nm to 400 nm, and the first color forming moiety and the second color forming moiety being bonded through a covalent bond.

<2> The electrophoretic composition of <1>, wherein the dye is a polymer dye that includes at least a repeating unit including the first color forming moiety and a repeating unit including the second color forming moiety.

<3> The electrophoretic composition of <2>, wherein the polymer dye further includes a structural unit derived from a non-water-soluble polymerizable compound, and a content of structural units derived from a non-water-soluble polymerizable compound is from 5% by mass to 95% by mass of the polymer dye.

<4> The electrophoretic composition of any one of <1> to <3>, wherein the dye is a dye for green, the maximum absorption wavelength of the first color forming moiety of the dye for green is in a range of from 400 nm to 500 nm, and the maximum absorption wavelength of the second color forming moiety of the dye for green is in a range of from 600 nm to 700 nm.

<5> The electrophoretic composition of <4>, wherein the first color forming moiety includes at least one partial structure selected from the group consisting of partial structures represented by any of the following formulae (1) to (4), and the second color forming moiety includes at least one partial structure that is different from the at least one partial structure included in the first color forming moiety and that is selected from the group consisting of partial structures represented by any of the following formulae (1) to (4) and partial structures derived from a phthalocyanine derivative.

  Formula (1)

In formula (1), each of $Ar^1$ and $Ar^2$ independently represents an aromatic ring, and at least one hydrogen atom is removed from $Ar^1$, $Ar^2$, or both $Ar^1$ and $Ar^2$.

Formula (2)

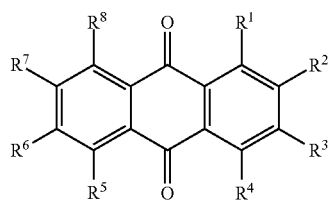

In formula (2), each of $R^1$ to $R^8$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfoic group, a carboxyl group, a halogen atom or a cyano group, and at least one hydrogen atom is removed from at least one moiety selected from the group consisting of $R^1$ to $R^8$.

Formula (3)

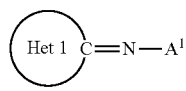

In formula (3), a ring structure including a carbon atom and represented by Het 1 represents an aromatic ring or a non-aromatic ring, $A^1$ represents an aromatic ring or a non-aromatic ring, and at least one hydrogen atom is removed from the ring structure, $A^1$, or both the ring structure and $A^1$.

Formula (4)

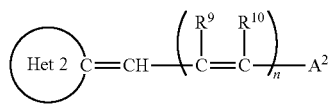

In formula (4), a ring structure including a carbon atom and represented by Het 2 represents an aromatic ring or a non-aromatic ring, $A^2$ represents an aromatic ring or a non-aromatic ring, each of $R^9$ and $R^{10}$ independently represents a hydrogen atom or an alkyl group, n represents 0, 1 or 2, and at least one hydrogen atom is removed from at least one moiety selected from the group consisting of the ring structure, $A^2$, $R^9$ and $R^{10}$.

<6> The electrophoretic composition according to <5>, wherein the first color forming moiety comprises at least one partial structure selected from the group consisting of partial structures represented by any of the formulae (1) and (4), and the second color forming moiety comprises at least one partial structure that is different from the at least one partial structure of the first color forming moiety and that is selected from the group consisting of partial structures represented by any of the formulae (3) and (4) and partial structures derived from a phthalocyanine derivative.

<7> The electrophoretic composition of any one of <1> to <3>, wherein, when the dye is a dye for blue, the maximum absorption wavelength of the first color forming moiety is in a range of from 500 nm to 575 nm, and the maximum absorption wavelength of the second color forming moiety is in a range of from 625 nm to 700 nm.

<8> The electrophoretic composition of <7>, wherein the first color forming moiety includes at least one partial structure selected from the group consisting of partial structures represented by any of the following formulae (1) to (5), and the second color forming moiety includes at least one partial structure that is different from the at least one partial structure included in the first color forming moiety and that is selected from the group consisting of partial structures represented by any of the following formulae (1) to (4) and partial structures derived from a phthalocyanine derivative.

  Formula (1)

In formula (1), each of $Ar^1$ and $Ar^2$ independently represents an aromatic ring, and, at least one hydrogen atom is removed from $Ar^1$, $Ar^2$, or both $Ar^1$ and $Ar^2$.

Formula (2)

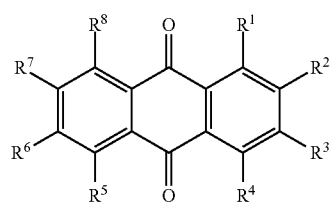

(2)

In formula (2), each of $R^1$ to $R^8$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and, at least one hydrogen atom is removed from at least one moiety selected from the group consisting of $R^1$ to $R^8$.

Formula (3)

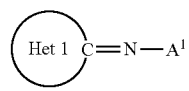

In formula (3), a ring structure including a carbon atom and represented by Het 1 represents an aromatic ring or a non-aromatic ring, $A^1$ represents an aromatic ring or a non-aromatic ring, and, in at least one of the ring structure or $A^1$, at least one hydrogen atom is removed from the ring structure, $A^1$, or both the ring structure and $A^1$.

Formula (4)

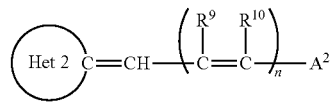

In formula (4), a ring structure including a carbon atom and represented by Het 2 represents an aromatic ring or a non-aromatic ring, $A^2$ represents an aromatic ring or a non-aromatic ring, each of $R^9$ and $R^{10}$ independently represents a hydrogen atom or an alkyl group, n represents 0, 1 or 2, and at least one hydrogen atom is removed from at least one moiety selected from the group consisting of the ring structure, $A^2$, $R^9$ and $R^{10}$.

Formula (5)

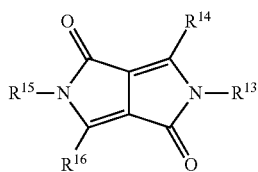

In formula (5), each of $R^{13}$ to $R^{16}$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^{13}$ to $R^{16}$.

<9> The electrophoretic composition according to <8>, wherein the first color forming moiety comprises at least one partial structure selected from the group consisting of partial structures represented by any of the formulae (1), (3) and (4), and the second color forming moiety comprises at least one partial structure that is different from the at least one partial structure of the first color forming moiety and that is selected from the group consisting of partial structures represented by any of the formulae (3) and (4) and partial structures derived from a phthalocyanine derivative.

<10> The electrophoretic composition of any one of <1> to <3>, wherein when the dye is a dye for red, the maximum absorption wavelength of the first color forming moiety is in a range of from 400 nm to 475 nm, and the maximum absorption wavelength of the second color forming moiety is in a range of from 525 nm to 600 nm.

<11> The electrophoretic composition of <10>, wherein the first color forming moiety includes at least one partial structure selected from the group consisting of partial structures represented by any of the following formulae (1) to (4), and the second color forming moiety includes at least one partial structure that is different from the at least one partial structure of the first color forming moiety and that is selected from the group consisting of partial structures represented by any of the following formulae (1) to (5) and partial structures derived from a phthalocyanine derivative.

$Ar^1$—N=N—$Ar^2$     Formula (1)

In formula (1), each of $Ar^1$ and $Ar^2$ independently represents an aromatic ring, and at least one hydrogen atom is removed from $Ar^1$, $Ar^2$, or both $Ar^1$ and $Ar^2$.

Formula (2)

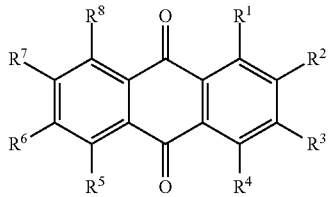

In formula (2), each of $R^1$ to $R^8$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^1$ to $R^8$.

Formula (3)

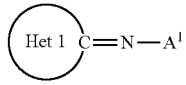

In formula (3), a ring structure including a carbon atom and represented by Het 1 represents an aromatic ring or a non-aromatic ring, $A^1$ represents an aromatic ring or a non-aromatic ring, and at least one hydrogen atom is removed from the ring structure, $A^1$, or both the ring structure and $A^1$.

Formula (4)

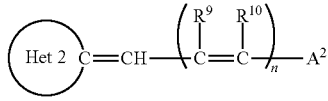

In formula (4), a ring structure including a carbon atom and represented by Het 2 represents an aromatic ring or a non-aromatic ring, $A^2$ represents an aromatic ring or a non-aromatic ring, each of $R^9$ and $R^{10}$ independently represents a hydrogen atom or an alkyl group, n represents 0, 1 or 2, and at least one hydrogen atom is removed from at least one moiety selected from the group consisting of the ring structure, $A^2$, $R^9$ and $R^{10}$.

(5)

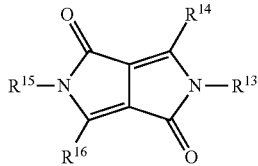

In formula (5), each of $R^{13}$ to $R^{16}$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^{13}$ to $R^{16}$.

<12> The electrophoretic composition according to <11>, wherein the first color forming moiety comprises at least one partial structure selected from the group consisting of partial structures represented by any of the formulae (1) and (4), and the second color forming moiety comprises at least one partial structure that is different from the at least one partial structure of the first color forming moiety and that is selected from the group consisting of partial structures represented by any of the formulae (1), (3) and (5).

<13> The electrophoretic composition of any one of <1> to <12>, wherein a ratio of an absorbance $Abs_1$ at the maximum absorption wavelength of the first color forming moiety to an absorbance $Abs_2$ at the maximum absorption wavelength of the second color forming moiety ($Abs_1$:$Abs_2$) is in a range of from 0.5:1 to 1:0.5.

<14> The electrophoretic composition of any one of <1> to <13>, wherein the covalent bond is formed by radical polymerization.

<15> The electrophoretic composition of any one of <1> to <14>, wherein the first color forming moiety and the second color forming moiety are bonded through at least one repeating structure selected from the group consisting of polyacrylate repeating structures, polymethacrylate repeating structures, polystyrene repeating structures, polyacrylamide repeating structures, polymethacrylamide repeating structures and polyvinyl ether repeating structures.

<16> The electrophoretic composition of any one of <1> to <15>, wherein the charged particles include titanium oxide particles, carbon black particles, or a mixture of titanium oxide particles and carbon black particles.

<17> A microcapsule incorporated therein the electrophoretic composition of any one of <1> to <16>.

<18> An electrophoretic display device including, in the following order, a first substrate having a first electrode, a microcapsule layer including the microcapsule of <17>, and a second substrate having a second electrode.

Advantageous Effects of the Invention

According to the present invention, an electrophoretic composition and a microcapsule that has excellent transparency and an electrophoretic display device that has excellent color reproducibility can be provided.

BRIEF DESCRIPTION OF THE DRAWING

FIG. 1 is a graph obtained by plotting absorbance (Abs) with respect to absorption wavelengths (λ) measured in a spectrophotometric measurement of polymer dye PG-1 for green used in Example 1.

DESCRIPTION OF EMBODIMENTS

Hereinafter, the electrophoretic composition of the present invention is described in detail.

In the present specification, a numerical range described by using the expression "from A to B" or "A to B" represents a range including numerical values A and B as the minimum value and the maximum value respectively.

In the present specification, the term "light" is used as a term having a concept including in its scope high energy rays such as ultraviolet rays, X rays or γ rays, and particle beams such as electron beams.

In the present specification, in order to indicate acrylic acid, methacrylic acid, or both of acrylic acid and methacrylic acid, the term "(meth)acrylic acid" may be used. Further, in order to indicate acrylate, methacrylate, or both of acrylate and methacrylate, the term "(meth)acrylate" may be used.

The content amount is indicated based on mass unless noted specifically otherwise. "% by mass" means a ratio with respect to the total amount of the composition, and the term "solid content" means the components included in a composition other than solvents.

<Electrophoretic Composition>

The electrophoretic composition of the present invention includes a dye, a non-water-soluble dispersion medium, and charged particles. The dye includes in a molecule thereof at least two color forming moieties including a first color forming moiety and a second color forming moiety. The first color forming moiety has a maximum absorption wavelength that is the shortest maximum absorption wavelength among the at least two color forming moiety. The second color forming moiety has a maximum absorption wavelength that is the longest maximum absorption wavelength among the at least two color forming moiety, and the difference between the maximum absorption wavelength of the first color forming moiety and the maximum absorption wavelength of the second color forming moiety is from 50 nm to 400 nm. The first color forming moiety and the second color forming moiety are bonded through a covalent bond. Hereinafter, the dye including the at least two color forming moieties including the first color forming moiety and the second color forming moiety may be referred to as a specific dye.

In electrophoretic display devices, a color electrophoretic display is realized by inclusion of a coloring material represented by a dye. In particular, a method has been proposed in which electrophoretic compositions colored with red (R), green (G) and blue (B) respectively are arranged in parallel, and in this method, in general, a color is formed by mixing two or more coloring materials which are different from each other in a maximum absorption wavelength to light. For example, in general, a green color is formed by mixing a yellow coloring material and a cyan coloring material. However, when the yellow coloring material or the cyan coloring material is localized or an amount ratio of these coloring materials is changed, a yellowish or bluish color, for example, may be obtained rather than an intended green color. Accordingly, in order to adjust a color using a dye (or dyes), in general, two or more dyes are used, and an amount ratio of the dyes and dispersion uniformity of the dyes in the composition are adjusted, whereby, a color is adjusted. On the other hand, however, depending on the amount ratio of the dyes or the dispersion uniformity of the dyes in the composition, a color of the color electrophoretic display is also changed. Further, when the amount ratio changes or dispersion of the dyes becomes non-uniform, color irregularity may occur or color reproducibility may deteriorate.

As described in the above, in general, an electrophoretic display device is provided with a pair of substrate disposed to have a gap therebetween. Each substrate of the pair of substrates has an electrode that is an electrically conductive layer and the electrically conductive layer of at least one of the substrates is transparent. Between these substrates, an electrophoretic composition is disposed. Dyes are generally vulnerable to deterioration caused by light or heat. Dye molecules present around the electrode which is often heated tend to more easily deteriorate compared with dye molecules present apart from the electrode. Further, when the charged amount is larger in the dyes, the dyes used in electrophoretic composition may be more easily moved, and thus the distribution of the dyes may be easily changed. In other words, conventionally, it is difficult to uniformly disperse dyes in electrophoretic display devices.

Accordingly, conventionally, in an electrophoretic composition, for example, a low molecular weight dyes may sometimes be deteriorated. Further, distribution of dyes may become non-uniform to upset the balance of an amount ratio among two or more different dyes, which may lead to change in color or deterioration in color reproducibility. As a result, transparency of an electrophoretic composition and an electrophoretic display device may decrease.

According to the electrophoretic composition of the present invention, the electrophoretic composition has high transparency, and, therefore, high transparency of microcapsules containing the electrophoretic composition of the present invention, and high transparency of the electrophoretic display device containing the microcapsules can also be attained.

The reason therefor has note been completely clarified, but can be speculated as follows.

The dye (specific dye) included in the electrophoretic composition of the invention includes at least two color forming moieties in a molecule thereof. The first color forming moiety has a maximum absorption wavelength that is the shortest maximum absorption wavelength among the at least two color forming moiety, and the second color forming moiety has a maximum absorption wavelength that is the longest maximum absorption wavelength among the at least two color forming moiety. The difference between the maximum absorption wavelength of the second color forming moiety and the maximum absorption wavelength of the first color forming moiety is from 50 nm to 400 nm. The first color forming moiety and the second color forming moiety are bonded through a covalent bond. That is, the specific dye is a dye including two more coloring materials in one molecule thereof.

In the present specification, a dye means a color forming factor which dissolves in a specific dispersion medium such as water or alcohol. A coloring material means a color forming factor having one maximum light absorption wavelength, regardless of solubility to a dispersion medium.

A conventional dye has one color forming moiety, and, in this case, a coloring material which dissolves in a dispersion medium and a dye have the same meaning.

The specific dye dissolves in a non-water-soluble dispersion medium and includes two or more coloring materials (color forming moieties). The specific dye has two or more maximum absorption wavelengths.

As described in the above, in conventional electrophoretic compositions, various colors are formed by combining two or more dyes (coloring materials); however it is thought that there are issues, for example, when one among the two or more dyes (coloring materials) deteriorates, a balance of amount ratio may be upset, or when a part of the dyes is localized, color irregularity may be caused. According to the specific dye used in the present invention, since the dye has two or more different coloring materials (color forming moieties) in one molecule, a desired color can be formed by one molecule. Further, since different coloring materials (color forming moieties) are bonded to each other through a covalent bond, in the specific dye, localization, for example, a case in which one coloring material is located apart from other coloring materials, may not occur. Further, even when the specific dye move toward the portion around an electrode, deterioration of only a part of the coloring materials (color forming moieties) is unlikely to occur, and, therefore, upsetting of the balance of amount ratio of dyes due to such partial deterioration of the coloring materials is also unlikely to occur.

Taking, as an example, green coloring by using a cyan dye and a yellow dye, it is thought that in a specific dye for forming green in which an yellow coloring material (color forming moiety) and a cyan coloring material (color forming moiety) are bonded through covalent bond, the amount ratio of the yellow coloring material (color forming moiety) and the cyan coloring material (color forming moiety) is fixed by molecular design, and therefore color irregularity, such as a phenomenon in which color is changed to an yellowish or bluish color in each preparation of an electrophoretic composition, is unlikely to occur, and reproducibility of a desired green color generated by molecular design of the dye can be enhanced.

As described above, in the specific dye, the amount ratio of coloring materials (color forming moieties) are fixed according to the molecular structure of the dye, and, therefore, enhanced color reproducibility can be attained. Further, in the specific dye, since the coloring materials (color forming moieties) are bonded to each other, localization of a part of coloring materials is unlikely to occur, and, therefore, color non-uniformity can be suppressed.

It is thought that, as a result, the electrophoretic composition is unlikely to be turbid and has high transparency.

Accordingly, when using the electrophoretic composition of the present invention, microcapsules are formed and an electrophoretic display device is formed, color electrophoretic display which is not turbid and has high transparency can be realized.

Hereinbelow, the electrophoretic composition of the present invention is described in detail.

[Specific Dye]

The specific dye in the present invention includes in a molecule thereof at least two color forming moieties including a first color forming moiety and a second color forming moiety. The first color forming moiety has a maximum absorption wavelength that is the shortest maximum absorption wavelength among the at least two color forming moiety. The second color forming moiety has a maximum absorption wavelength that is the longest maximum absorption wavelength among the at least two color forming moiety. The difference between the maximum absorption wavelength of the first color forming moiety and the maximum absorption wavelength of the second color forming moiety is from 50 nm to 400 nm. The first color forming moiety and the second color forming moiety are bonded through a covalent bond.

The specific dye includes in a molecule thereof a the first color forming moiety and the second color forming moiety, but in embodiments, the specific dye may further include one or more additional color forming moieties, such as a third, forth and further color forming moieties, in addition to the first color forming moiety and the second color forming moiety. The specific dye may include three or more color forming moiety in a molecule thereof. Among the two or more color forming moieties, a color forming moiety having a maximum absorption wavelength that is the shortest maximum absorption wavelength among the two or more color forming moiety is referred as a first color forming moiety. Among the two or more color forming moieties, a color forming moiety having a maximum absorption wavelength that is the longest maximum absorption wavelength among the two or more color forming moiety is referred as a second color forming moiety. The maximum absorption wavelength of the first color forming moiety may also be referred to as $\lambda_1$ and the maximum absorption wavelength of the second color forming moiety may also be referred to as $\lambda_2$.

In the specific dye, the difference $\Delta\lambda$ between the maximum absorption wavelength $\lambda_1$ of the first color forming moiety and the maximum absorption wavelength $\lambda_2$ of the second color forming moiety is from 50 nm to 400 nm. That is, $50\ nm \leq \Delta\lambda (=|\lambda_2 - \lambda_1|) \leq 400\ nm$.

In the present invention, the maximum absorption wavelength of a color forming moiety is measured by spectrophotometric measurement at room temperature (25° C.) of a 0.005% by mass solution of a coloring material in which 0.005% by mass of a coloring material forming the color forming moiety is dissolved in methylene chloride, using a quartz cell of 1 cm.

Specifically, when the specific dye is a polymer dye which is described below, the specific dye is obtained by, for example, copolymerizing at least a polymerizable compound having a first color forming moiety, and a polymerizable compound having a second color forming moiety. The maximum absorption wavelength $\lambda_1$ of the specific dye is determined by spectrophotometric measurement of a solution in which 0.005% by mass of the polymerizable compound having the first color forming moiety under the conditions as described above.

Coloring materials having the difference of the maximum absorption wavelength therebetween of less than 50 nm have color hues similar to each other. Accordingly, from the viewpoint of differentiating a hue of the first color forming moiety from a hue of the second color forming moiety, the difference between the maximum absorption wavelength of the first color forming moiety and the maximum absorption wavelength of the second color forming moiety is 50 nm or more. On the other hand, since the absorption wavelength range of visible light is from 380 nm to 770 nm, $\Delta\lambda$ is 400 nm or less.

$\Delta\lambda$ is preferably from 60 nm to 380 nm, more preferably from 70 nm to 350 nm, from the viewpoint of enhancing color reproducibility.

$\Delta\lambda$ of the specific dye can be controlled by adjusting the structures of the first color forming moiety and the second color forming moiety.

The specific dye preferably has a ratio of absorbance (intensity of absorption of light) at maximum absorption wavelengths of the color forming moieties as described below.

A ratio of the absorbance $Abs_1$ at the maximum absorption wavelength of the first color forming moiety to the absorbance $Abs_2$ at the maximum absorption wavelength of the second color forming moiety ($Abs_1:Abs_2$) is preferably in a range of from 0.5:1 to 1:0.5. When the ratio $Abs_1:Abs_2$ is in the range of from 0.5:1 to 1:0.5, the color reproduction latitude may be enhanced. The ratio $Abs_1:Abs_2$ is more preferably in a range of from 0.6:1 to 1:0.6.

The absorbance $Abs_1$ and the absorbance $Abs_2$ can be controlled by adjusting the content ratio of the first color forming moiety and the content ratio of the second color forming moiety in a molecule of the specific dye.

In other words, the ratio of the absorbance $Abs_1$ and the absorbance $Abs_2$ corresponds to the ratio of the amount of the first color forming material and the amount of the second color forming material.

For measuring the absorbance at the maximum absorption wavelength of each color forming moiety, coloring material solutions (solutions in which a coloring material is dissolved in methylene chloride) respectively having a concentration corresponding to the content ratio of the first color forming moiety in the specific dye and having a concentration correspond to the content ratio of the second color forming moiety in the specific dye are prepared and the absorbance of each of the solutions is measured. Specifically, when the content ratio of the first color forming moiety to the second color forming moiety (first color forming moiety: second color forming moiety) is 2:3, the coloring material solution of the coloring material having the first color forming moiety and the coloring material solution of the coloring material having the second color forming moiety are prepared such that a ratio of the concentration of the coloring material having the first color forming moiety to the concentration of the coloring material having the second color forming moiety is 2:3.

When the specific dye is a polymer dye, for example, when the specific dye is a polymer dye which is obtained by polymerizing monomers including polymerizable compound X having the first color forming moiety and polymerizable compound Y having the second color forming moiety and which contains repeating unit x derived from X and repeating unit y derived from Y so as to have a mass ratio x:y of 2:3, a solution of polymerizable compound X and the solution of polymerizable compound Y are prepared such that a ratio of the concentration of the solution of polymerizable compound X and the concentration of the solution of polymerizable compound Y is 2:3. For example, a solution of polymerizable compound X having a concentration of 0.004% by mass and a solution of polymerizable compound Y having a concentration of 0.006% by mass may be prepared.

The method of measuring the absorbance is substantially the same as the method of measuring a maximum absorption wavelength in that a coloring material solution in which a coloring material is dissolved in methylene chloride is measured by spectrophotometric measurement at room temperature (25° C.) using a quartz cell of 1 cm.

$\lambda_1$, $\lambda_2$, $\Delta\lambda$, $Abs_1$ and $Abs_2$ are generally varied depending on the color of the specific dye.

Hereinbelow, $\lambda_1$, $\lambda_2$, $\Delta\lambda$, $Abs_1$, $Abs_2$ and embodiments of each color forming moiety of a specific dye are described with respect each of a case in which a specific dye is used as a dye for green, a case in which a specific dye is used as a dye for blue, and a case in which a specific dye is used as a dye for red. Hereinbelow, $\lambda_1$, $\lambda_2$, $\Delta\lambda$, $Abs_1$ and $Abs_2$ for each of the specific dye for green, the specific dye for blue and the specific dye for red are referred to as follows.

$\lambda_1$, $\lambda_2$, $\Delta\lambda$, $Abs_1$ and $Abs_2$ of specific dye for green (G): $\lambda_{G1}$, $\lambda_{G2}$, $\Delta\lambda_G$, $Abs_{G1}$ and $Abs_{G2}$ $\lambda_1$, $\lambda_2$, $\Delta\lambda$, $Abs_1$ and $Abs_2$ of specific dye for blue (B): $\lambda_{B1}$, $\lambda_{B2}$, $\Delta\lambda_B$, $Abs_{B1}$ and $Abs_{B2}$ $\lambda_1$, $\lambda_2$, $\Delta\lambda$, $Abs_1$ and $Abs_2$ of specific dye for blue (B): $\lambda_{R1}$, $\lambda_{R2}$, $\Delta\lambda_R$, $Abs_{R1}$ and $Abs_{R2}$ —Dye for Green (G)—

When the specific dye is use as a dye for green (G), it is preferable that $\lambda_{G1}$ be from 400 nm to 500 nm and $\lambda_{G2}$ be from 600 nm to 700 nm. A $\Delta\lambda_G$ is preferably from 150 nm to 250 nm. $Abs_{G1}:Abs_{G2}$ is preferably from 0.6:1 to 1:0.6.

In order to adjust $\lambda_{G1}$ to be in a range of from 400 nm to 500 nm, the first color forming moiety of the specific dye preferably includes at least one partial structure selected from the group consisting of partial structures represented by any of the following formulae (1) to (4). The first color forming moiety of the specific dye may include all of a partial structure represented by formula (1), a partial structure represented by formula (2), a partial structure represented by formula (3) and a partial structure represented by formula (4). The first color forming moiety of the specific dye may include, among the partial structures represented by formulae (1) to (4), only one partial structure.

$$Ar^1\text{—}N\text{=}N\text{—}Ar^2 \qquad (1)$$

In formula (1), $Ar^1$ and $Ar^2$ each independently represent an aromatic ring, and at least one hydrogen atom is removed from $Ar^1$, $Ar^2$, or both $Ar^1$ and $Ar^2$.

The expression "at least one hydrogen atom is removed" means, for example, when $Ar^1$ and $Ar^2$ each independently represent a benzene ring, one or both of $Ar^1$ and $Ar^2$ are a phenylene group, which is a divalent group, or a tri- or higher-valent benzene ring. That is, the partial structure represented by formula (1) is a monovalent group or a di- or higher-valent linking group and is capable of bonding to another partial structure such as a second color forming moiety. In formulae (2) to (5), which are described below, the same applies to the recitation "at least one hydrogen atom is removed". This also applies to the dye for blue (B) and the dye for red (R), each of which is described below.

When the second color forming moiety includes a partial structure represented by any of formulae (1) to (5), the expression "at least one hydrogen atom is removed" means that the partial structure represented by any of formulae (1) to (5) is a monovalent group or a di- or higher-valent linking group and is capable of bonding to another partial structure such as a first color forming moiety. This also applies to the dye for blue (B) and the dye for red (R), which are described below.

As described above, a partial structure represented by formula (1) is a partial structure, and a partial structure represented by any of formula (2) to (5), which are described below, is also a partial structure. In the present specification, for the sake of convenience, embodiments of a structure in which no hydrogen atom is removed and thus forms one molecule are described with respect to formulae (1) to (5).

Examples of an aromatic ring represented by $Ar^1$ or $Ar^2$ in formula (1) include, benzene, naphthalene, fluorene, anthracene, indene, indan, biphenyl, pyridine, quinoline, thiazole, benzothiazole, oxazole, benzoxazole, imidazole, benzimidazole, pyrimidine, thiophene, pyrrol, furan and pyrazole.

Among the above, the aromatic ring is preferably benzene, pyridine, thiazole, pyrazole or pyrimidine, and is further preferably benzene or pyridine.

$Ar^1$ and $Ar^2$ each independently may further have a substituent.

Preferable examples of the partial structure represent by formula (1) include a partial structure in which $Ar^1$ is benzene and $Ar^2$ is benzene, pyridine, thiazole or pyrazole.

Examples of the substituent include an aliphatic group, an aryl group, a heterocyclic group, an acyl group, an acyloxy group, an acylamino group, an aliphatic oxy group, an aryloxy group, a heterocyclic oxy group, an aliphatic oxycarbonyl group, an aryloxycarbonyl group, a heterocyclic oxycarbonyl group, a carbamoyl group, an aliphatic sulfonyl group, an arylsulfonyl group, a heterocyclic sulfonyl group, an aliphatic sulfonyloxy group, an arylsulfonyloxy group, a heterocyclic sulfonyloxy group, a sulfamoyl group, an aliphatic sulfonamide group, an arylsulfonamide group, a heterocyclic sulfonamide group, an amino group, an aliphatic amino group, an arylamino group, a heterocyclic amino group, an aliphatic oxycarbonylmino group, an aryloxycarbonylamino group, a hetrocyclic oxycarbonylamino group, an aryloxycarbonylamino group, a heteorcyclic oxycarbonylamio group, an aliphatic sulfinyl group, an arylsulfinyl group, an aliphatic thio group, an arylthio group, a hydroxyl group, a cyano group, a sulfo group, a carboxyl group, an aliphatic oxyamino group, an aryloxyamino group, a carbomoylamino group, a sulfamoylamino group, a halogen atom, a sulfamoylcarbomoyl group, a carbamoylsulfamoyl group, a dialiphatic oxyphosphinyl group and a diaryloxyphosphinyl group. These groups may further have a substituent. Examples of the further substituent include substituents as described above.

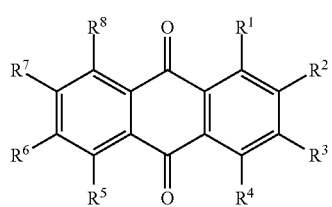

(2)

In formula (2), $R^1$ to $R^8$ each independently represent a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from in at least one moiety selected from the group consisting of $R^1$ to $R^8$.

$R^1$ to $R^8$ each independently may further have a substituent selected from the substituents as described above.

Examples of an alkyl group represented by any one of $R^1$ to $R^8$ in formula (2) include a straight chain, branched or cyclic alkyl group having from 1 to 12 carbon atoms, examples thereof including a methyl group, an ethyl group, an n-propyl group, an isopropyl group, an n-butyl group, a sec-butyl group, a t-butyl group, an n-pentyl group, an isopentyl group, a cyclopentyl group, an n-hexyl group, a cyclohexyl group, a heptyl group, an n-octyl group, a t-octyl group, a 2-ethylhexyl group, a nonyl group, and a decyl group.

Among the above, the alkyl group is preferably a methyl group, an ethyl group or an n-butyl group, and is further preferably a methyl group.

Examples of an aryl group represented by any one of $R^1$ to $R^8$ in formula (2) include an aryl group having from 6 to 36 carbon atoms, examples thereof including a phenyl group, a 2-naphthyl group and a biphenyl group.

Among the above, the aryl group is more preferably a phenyl group or a 2-naphthyl group, and is further preferably a phenyl group.

Examples of an alkoxy group represented by any one of $R^1$ to $R^8$ in formula (2) include an alkoxy group having from 1 to 28 carbon atoms, examples thereof including a methoxy group, an ethoxy group, a propoxy group, a isopropoxy group, a butoxy group, an isobutoxy group, an amyloxy group, an isoamyloxy group, a hexyloxy group, an octyloxy group and a 2-ethyl-hexyloxy group.

Among the above, the alkoxy group is preferably a methoxy group, an ethoxy group or an n-butyl group, and is further preferably a methoxy group.

Preferable examples of an aryloxy group represented by any one of $R^1$ to $R^8$ in formula (2) include an aryloxy group having from 6 to 36 carbon atoms, examples thereof including a pheoxy group, an p-methylphenoxy group, a p-chlorophenoxy group, a p-methoxyphenoxy group.

Among the above, the aryloxy group is preferably a pheoxy group or a p-methylphenoxy group, and is further preferably a phenoxy group.

Preferable examples of an amino group represented by any one of $R^1$ to $R^8$ in formula (2) include a primary amino group, a secondary amino group having one substituent, and a tertiary amino group having two substituents. Examples of the substituent which the amino group may have include the examples of the substituent as described above.

Among the above, the amino group is preferably an amino group, a dialkylamino group or a monoarylamino group, and is more preferably an amino group or a monoarylamino group.

Preferable examples of an alkylthio group represented by any one of $R^1$ to $R^8$ in formula (2) include an alkylthio group in which the alkyl group included in the alkylthio group is an alkyl group as defined as the alkyl group represented by any one of $R^1$ to $R^8$ as described above. Preferable examples of an arylthio group represented by any one of $R^1$ to $R^8$ in formula (2) include an arylthio group in which the aryl group included in the arylthio group is an aryl group as defined as the aryl group represented by any one of $R^1$ to $R^8$ as described above.

Examples of a halogen atom presented by $R^1$ to $R^8$ in formula (2) include a fluorine atom, a chlorine atom, a bromine atom and iodine atom.

Among the above, the halogen atom is preferably a fluorine atom or a chlorine atom.

Preferable examples of the partial structure represented by formula (2) include a partial structure in which $R^1$ is a hydrogen atom, an amino group, a hydroxyl group, an arylthio group, an alkoxy group, an aryloxy group or a sulfonic group, $R^2$ is a hydrogen atom, a halogen atom, a carbonyl group, an alkyl group, an aryl group, an alkoxy group, an aryloxy group or a cyano group, $R^3$ is a hydrogen atom, a halogen atom, a carbonyl group, an alkyl group, an aryl group, an alkoxy group, an aryloxy group or a cyano group, $R^4$ is a hydrogen atom, an amino group, a hydroxyl group, an arylthio group, an alkoxy group, an aryloxy group or a sulfonic group, $R^5$ is a hydrogen atom, an amino group, a hydroxyl group, an arylthio group, an alkoxy group, an aryloxy group or a sulfonic group, $R^6$ is a hydrogen atom, a halogen atom, a carbonyl group, an alkyl group, an aryl group, an alkoxy group, an aryloxy group or a cyano group, $R^7$ is a hydrogen atom, a halogen atom, a carbonyl group, an alkyl group, an aryl group, an alkoxy group, an aryloxy group or a cyano group, and $R^8$ is a hydrogen atom, an amino group, a hydroxyl group, an arylthio group, an alkoxy group, an aryloxy group or a sulfonic group.

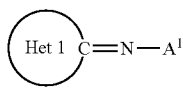

(3)

In formula (3), a ring structure including a carbon atom and represented by Het 1 represents an aromatic ring or a non-aromatic ring, $A^1$ represents an aromatic ring or a non-aromatic ring, and at least one hydrogen atom is removed from the ring structure, $A^1$ or, both the ring structure and $A^1$.

The ring structure and $A^1$ each independently may have a substituent, and examples of the substituent include those described above.

In formula (3), the aromatic ring including a carbon atom and represented by Het 1 is not particularly restricted and may be any aromatic ring which is capable of having, as one of members forming the ring, a carbon atom ($>C=$) bonded to the nitrogen atom through a double bond. Examples of the aromatic ring include a benzene ring, a pyrazole ring, an isoxazole ring, a pyrazolotriazole ring, a pyrrolotriazole ring, a naphthalene ring, a pyridine ring and a quinoline ring.

Among the above, the aromatic ring is preferably a benzene ring, a pyrazole ring, an isoxazole ring, a pyrazolotriazole ring or a pyrrolotriazole ring.

In formula (3), the non-aromatic ring including a carbon atom and represented by Het 1 is not particularly restricted and may be any non-aromatic ring which is capable of having, as one of members forming the ring, a carbon atom ($>C=$) bonded to the nitrogen atom through a double bond. Examples of the non-aromatic ring include a thiazoline ring, an oxazoline ring, an imdazoline ring, a tetrahydrofuran ring, a tetrahydrothiophene ring and a tetrahydropyrrol ring.

Among the above, the non-aromatic ring is preferably a thiazoline ring or an oxazoline ring.

Examples of the aromatic ring represented by $A^1$ in formula (3) include benzene, naphthalene, fluorene, anthracene, indene, indane, biphenyl, pyrridine and quinoline.

Among the above, the aromatic ring is preferably benzene, naphthalene, pyrridine, or quinoline, and more preferably benzen or pyrridine.

Examples of the non-aromatic ring represented by $A^1$ in formula (3) include a cycloaliphatic ring, such as cycloheptane, cyclohexane or cyclooctane, and a substituted cycloaliphatic ring, such as a compound in which one or more carbon atoms of members forming a cycloaliphatic ring is replaced with a hetero atom such as an oxygen atom, a sulfur atom or a nitrogen atom.

Among the above, the non-aromatic ring is preferably a thiazoline ring, an oxazoline ring, an imidazoline ring, a tetrahydrofuran ring, a tetrahydrothiophene ring or a tetrohydropyrrol ring, and is more preferably a thiazoline ring, an oxazoline ring or an imidazoline ring.

Preferable examples of the partial structure represented by formula (3) include a partial structure in which the ring structure including a carbon atom and represented by Het 1 is a benzene ring, a naphthalene ring, a pyrazole ring, an isoxazole ring, a pyrazolotriazole ring or a pyrrolotriazole ring, and $A^1$ is a benzene ring or a pyridine ring.

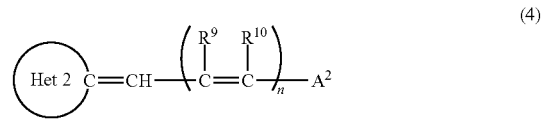

(4)

In formula (4), a ring structure including a carbon atom and represented by Het 2 represents an aromatic ring or a non-aromatic ring, $A^2$ represents an aromatic ring or a non-aromatic ring, $R^9$ and $R^{10}$ each independently represent a hydrogen atom or an alkyl group, n represents 0, 1 or 2, and at least one hydrogen atom is removed from at least one moiety selected from the group consisting of the ring structure, $A^2$, $R^9$ and $R^{10}$.

The ring structure, $A^2$, $R^9$ and $R^{10}$ each independently may have a substituent, and examples of the substituent include those described above.

In formula (4), the aromatic ring including a carbon atom and represented by Het 2 is not particularly restricted and may be any aromatic ring which is capable of having, as one of members forming the ring, a carbon atom ($>C=$) bonded to the trivalent hydrocarbon group ($=CH-$) through a double bond. Examples of the aromatic ring include a benzene ring, a pyrazole ring, an isoxazole ring, a pyrazolotriazole ring, a pyrrolotriazole ring, a naphthalene ring, a pyridine ring, a quinoline ring, an indolenine ring, a thiazole ring, a benzothiazole ring, an oxazole ring, a benzoxazole ring, an imidazole ring and a benzoimidazole ring.

Among the above, the aromatic ring is preferably a benzene ring, a pyrazole ring, an isoxazole ring, a pyrazolotriazole ring, a pyrrolotriazole ring, a naphthalene ring, a pyridine ring, a quinoline ring or an indolenine ring.

In formula (4), the non-aromatic ring including a carbon atom and represented by Het 2 is not particularly restricted and may be any non-aromatic ring which is capable of having, as one of members forming the ring, a carbon atom ($>C=$) bonded to the trivalent hydrocarbon group ($=CH-$). Examples of the non-aromatic ring include a thiazoline ring, an oxazoline ring, an imdazoline ring, a tetrahydrofuran ring, a tetrahydrothiophene ring and a tetrahydropyrrol ring.

Among the above, the non-aromatic ring is preferably a thiazoline ring, an oxazoline ring or an imidazoline ring.

Examples of the alkyl group represented by any one of $R^9$ and $R^{10}$ in formula (4) include a straight chain, branched or cyclic alkyl group having from 1 to 12 carbon atoms, examples thereof including a methyl group, an ethyl group, an n-propyl group, an isopropyl group, an n-butyl group, a sec-butyl group, a t-butyl group, an n-pentyl group, an isopentyl group, a cyclopentyl group, an n-hexyl group, a cyclohexyl group, an heptyl group, an n-octyl group, a t-octyl group, a 2-ethylhexyl group, a nonyl group, and a decyl group.

Among the above, the alkyl group is preferably a methyl group or an ethyl group, and is more preferably a methyl group.

Examples of the aromatic ring represented by $A^2$ in formula (4) include benzene, naphthalene, fluorene, anthracene, indene, indane, biphenyl, byrridine, quinoline, indolenine, thiazole, benzothiazole, oxazole, benzoxazole, imidazole and benzoimidazole.

Among the above, the aromatic ring is preferably benzene, pyrridine, or indolenine, and more preferably benzene or pyrridine.

Examples of the non-aromatic ring represented by $A^2$ in formula (4) include a cycloaliphatic ring, such as cycloheptane, cyclohexane or cyclooctane, and a substituted cycloaliphatic ring, such as a compound in which one or more carbon atoms of members forming a cycloaliphatic ring is replaced with a hetero atom such as an oxygen atom, a sulfur atom or a nitrogen atom.

Among the above, the non-aromatic ring is preferably a thiazoline ring, an oxazoline ring, an imidazoline ring, a tetrahydrofuran ring, a tetrahydrothiophene ring or a tetrohydropyrrol ring, and is more preferably a thiazoline ring or an oxazoline ring.

The partial structure represented by formula (4) may be, for example, a polymethine coloring material. Examples of the polymethine coloring material include a cyanine coloring material, a merocyanine coloring material and an oxonole coloring material. Specific compounds of these polymethine coloring materials are described in, for example, N. Tyutyulkov, Polymethine Dyes—Structure and Properties, St. Kliment Ohridski University Press, Sofia, 1991.

Preferable examples of the partial structure represented by formula (4) include a partial structure in which the ring structure including a carbon atom and represented by Het 2 is a benzene ring, a pyrazole ring, an isoxazole ring, a pyrazolotriazole ring, a pyrrolotriazole ring, a naphthalene ring, a pyridine ring, a quinoline ring or a indolenine ring, $R^9$ is a hydrogen atom, $R^{10}$ is a hydrogen atom, and $A^2$ is a benzene ring, a pyridine ring or a indolenine ring.

When the specific dye is a dye for green (G), the first color forming moiety preferably includes a partial structure represented by formula (1) or a partial structure represented by formula (4), and more preferably includes a partial structure represented by formula (1).

Next, preferable embodiments of a partial structure included in the second color forming moiety in the specific dye used as a dye for green are described.

In order to adjust $\lambda_{G2}$ to be in a range of from 600 nm to 700 nm, the second color forming moiety preferably includes at least one partial structure that is different from the partial structure included in the first color forming moiety and that is selected from the group consisting of partial structures represented by any of formulae (1) to (4) and partial structures derived from a phthalocyanine derivative.

The second color forming moiety may include all of a partial structure represented by formula (1), a partial structure represented by formula (2), a partial structure represented by formula (3), a partial structure represented by formula (4) and a partial structure derived from a phthalocyanine derivative. The second color forming moiety of the specific dye may include only one partial structure among the partial structures represented by any of formulae (1) to (4) and the partial structure derived from a phthalocycnine derivative.

Details of the partial structure represented by formula (1), the partial structure represented by formula (2), the partial structure represented by formula (3) and the partial structure represented by formula (4) are as described above. In order to adjust $\lambda_{G2}$ to be in a range of from 600 nm to 700 nm, the partial structure represented by formula (1), the partial structure represented by formula (2), the partial structure represented by formula (3) and the partial structure represented by formula (4) are preferably as described below.

The partial structure represented by formula (1) is preferably a partial structure in which $Ar^1$ is benzene and $Ar^2$ is thiazole.

The partial structure represented by formula (2) is preferably a partial structure in which $R^1$ is an amino group, $R^2$ is a hydrogen atom, a carbonyl group or a cyano group, $R^3$ is a hydrogen atom, a carbonyl group or a cyano group, $R^4$ is an amino group or an arylthio group, $R^5$ is a hydrogen atom, an amino group or an arylthio group, $R^6$ is a hydrogen atom, a carbonyl group or a cyano group, $R^7$ is a hydrogen atom, a carbonyl group or a cyano group, and $R^8$ is a hydrogen atom, an amino group or an arylthio group.

The partial structure represented by formula (3) is preferably a partial structure in which the ring structure including a carbon atom and represented by Het 1 is pyrazolotriazole, and $A^1$ is benzene.

The partial structure represented by formula (4) is preferably a partial structure in which the ring structure including a carbon atom and represented by Het 2 is pyrrolotriazole, indolenine or pyridone, $R^9$ is a hydrogen atom or a hydroxyl group, $R^{10}$ is a hydrogen atom, and $A^2$ is benzene or indolenine.

When the specific dye is used as a dye for green (G), the second color forming moiety may include a partial structure derived from a phthalocyanine derivative.

The partial structure derived from a phthalocyanine derivative means a status in which at least one hydrogen atom is removed from a phthalocyanine derivative.

The definition of the expression "at least one hydrogen atom is removed" is as described in formula (1) in the above, and the expression means a status in which the partial structure represented by formula (1) is a monovalent group or a di- or higher-valent linking group and is capable of bonding to another partial structure such as a first color forming moiety.

When the specific dye is a dye for green (G), the second color forming moiety preferably includes, among the above described partial structures, a partial structure represented by formula (3), a partial structure represented by formula (4) or a partial structure derived from a phthalocyanine derivative.

Next, preferable embodiments of a partial structure included in the first color forming moiety in the specific dye used as a dye for green are described.

—Dye for Blue (B)—

When the specific dye is use as a dye for blue (B), it is preferable that $\lambda_{B1}$ be from 500 nm to 575 nm and $\lambda_{B2}$ be from 625 nm to 700 nm. $\Delta\lambda_B$ is preferably from 60 nm to 180 nm. $Abs_{B1}:Abs_{B2}$ is preferably from 0.6:1 to 1:0.6.

In order to adjust $\lambda_{B1}$ to be in a range of from 500 nm to 575 nm, the first color forming moiety of the specific dye preferably includes at least one partial structure selected from the group consisting of partial structures represented by any of formulae (1) to (4) and partial structures represented by formula (5) which are described below.

The first color forming moiety of the specific dye may include all of a partial structure represented by formula (1), a partial structure represented by formula (2), a partial structure represented by formula (3), a partial structure represented by formula (4) and a partial structure represented by formula (5). The first color forming moiety of the specific dye may include only one partial structure among formulae (1) to (5).

Details of the partial structure represented by formula (1), the partial structure represented by formula (2), the partial structure represented by formula (3) and the partial structure represented by formula (4) are as described above. In order to adjust $\lambda_{B1}$ to be in a range of from 500 nm to 575 nm, the partial structure represented by formula (1), the partial structure represented by formula (2), the partial structure represented by formula (3) and the partial structure represented by formula (4) are preferably as described below.

The partial structure represented by formula (1) is preferably a partial structure in which $Ar^1$ is benzene and $Ar^2$ is thiazole.

The partial structure represented by formula (2) is preferably a partial structure in which $R^1$ is an amino group or an arylthio group, $R^2$ is a hydrogen atom, a carbonyl group or a cyano group, $R^3$ is a hydrogen atom, a carbonyl group or a cyano group, $R^4$ is a hydrogen atom, an amino group or an arylthio group, $R^5$ is a hydrogen atom, an amino group or an arylthio group, $R^6$ is a hydrogen atom, a carbonyl group or a cyano group, $R^7$ is a hydrogen atom, a carbonyl group or a cyano group, and $R^8$ is a hydrogen atom, an amino group or an arylthio group.

The partial structure represented by formula (3) is preferably a partial structure in which the ring structure including a carbon atom and represented by Het 1 is pyrazole or pyrazolotriazole, and $A^1$ is benzene.

The partial structure represented by formula (4) is preferably a partial structure in which the ring structure including a carbon atom and represented by Het 2 is indolenine, barbituric acid, thiobarbituric acid or pyridone, $R^9$ is a hydrogen atom or a hydroxyl group, $R^{10}$ is a hydrogen atom, and $A^2$ is benzene or indolenine.

When the specific dye is used as a dye for blue (B), the first color forming moiety may include a partial structure represented by the following formula (5).

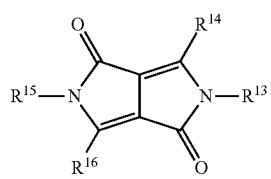

(5)

In formula (5), $R^{13}$ to $R^{16}$ each independently represent a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^{13}$ to $R^{16}$.

The alkyl group, the aryl group, the alkoxy group, the aryloxy group, the amino group, the thiol group, the alkylthio group, the arylthio group and the halogen atom represented by any one of $R^{13}$ to $R^{16}$ in formula (5) respectively have the same definition as the alkyl group, the aryl group, the alkoxy group, the aryloxy group, the amino group, the thiol group, the alkylthio group, the arylthio group and the halogen atom described in formula (2).

When the specific dye is used as a dye for blue (B), the alkyl group, the aryl group, the alkoxy group, the aryloxy group, the amino group, the thiol group, the alkylthio group, the arylthio group and the halogen atom represented by any one of $R^{13}$ to $R^{16}$ in formula (5) are preferably as follows.

The alkyl group is preferably a methyl group, an ethyl group, a butyl group, and more preferably a methyl group or an ethyl group.

The aryl group is preferably a phenyl group a 2-naphtyl group or a biphenyl group, and more preferably a phenyl group or a 2-naphthyl group.

The alkoxy group is preferably a methoxy group, an ethoxy group or a butoxy group, and more preferably a methoxy group or an ethoxy group.

The aryloxy group is preferably a phenoxy group, a 2-naphtyloxy group or a biphenyloxy group, and more preferably a phenoxy group.

The amino group is preferably an amino group, a dialkylamino group or a monoarylamino group, and more preferably an amino group or a dialkylamino group.

The alkylthio group is preferably a methylthio group, an ethylthio group or butylthio group, and more preferably a methylthio group or an ethylthio group.

The arylthio group is preferably a phenylthio group, a 2-naphthylthio group or a bephenylthio group, and more preferably a phenylthio group or a 2-naphthylthio group.

The halogen atom is preferably a fluorine atom, a chlorine atom or a bromine atom, and more preferably a fluorine atom or a chlorine atom.

The partial structure represented by formula (5) is preferably a partial structure in which $R^{13}$ is a hydrogen atom, an alkyl group or an aryl group, $R^{14}$ is a hydrogen atom, a halogen atom, an amino group, an alkyl group, an aryl group or a carbonyl group, $R^{15}$ is a hydrogen atom, an alkyl group or an aryl group and $R^{16}$ is a hydrogen atom, a halogen atom, an amino group, an alkyl group, an aryl group or a carbonyl group.

When the specific dye is a dye for blue (B), the first color forming moiety preferably includes, among the partial structure as described above, a partial structure represented by formula (1), a partial structure represented by formula (3) or a partial structure represented by formula (4), and more preferably includes a partial structure represented by formula (4).

Next, preferable embodiments of a partial structure included in the second color forming moiety in the specific dye used as a blue (B) dye are described.

In order to adjust $\lambda_{B2}$ to be in a range of from 625 nm to 700 nm, the second color forming moiety preferably includes at least one partial structure that is different from the partial structure included in the first color forming moiety and that is selected from the group consisting of partial structures represented by any of formulae (1) to (4) and partial structures derived from a phthalocyanine derivative.

The second color forming moiety of the specific dye may include, for example, all of a partial structure represented by formula (1), a partial structure represented by formula (2), a partial structure represented by formula (3), a partial structure represented by formula (4) and a partial derived from a phthalocyanine derivative. The second color forming moiety of the specific dye may include only one partial structure among the partial structures represented by any of formulae (1) to (4) and the partial structures derived from a phthalocycnine derivative.

Details of the partial structure represented by formula (1), the partial structure represented by formula (2), the partial structure represented by formula (3), the partial structure represented by formula (4), and the partial structure derived from a phthalocyanine derivative are as described above. In order to adjust $\lambda_{B2}$ to be in a range of from 625 nm to 700 nm, the partial structure represented by formula (1), the partial structure represented by formula (2), the partial structure represented by formula (3) and the partial structure represented by formula (4) are preferably as described below.

The partial structure represented by formula (1) is preferably a partial structure in which $Ar^1$ is benzene and $Ar^2$ is thiazole.

The partial structure represented by formula (2) is preferably a partial structure in which $R^1$ is an amino group, $R^2$ is a hydrogen atom, a carbonyl group or a cyano group, $R^3$ is a hydrogen atom, a carbonyl group or a cyano group, $R^4$ is an amino group or an arylthio group, $R^5$ is a hydrogen atom, an amino group or an arylthio group, $R^6$ is a hydrogen atom, a carbonyl group or a cyano group, $R^7$ is a hydrogen atom, a carbonyl group or a cyano group, and $R^8$ is a hydrogen atom, an amino group or an arylthio group.

The partial structure represented by formula (3) is preferably a partial structure in which the ring structure including a carbon atom and represented by Het 1 is pyrrolotriazole, and $A^1$ is benzene.

The partial structure represented by formula (4) is preferably a partial structure in which the ring structure including a carbon atom and represented by Het 2 is pyrrolotriazole, indolenine or pyridone, $R^9$ is a hydrogen atom or a hydroxyl group, $R^{10}$ is a hydrogen atom, and $A^2$ is benzene or indolenine.

When the specific dye is a dye for blue (B), the second color forming moiety preferably includes, among the above described partial structures, a partial structure represented by formula (3), a partial structure represented by formula (4) or a partial structure derived from a phthalocyanine derivative.

Next, preferable embodiments of a partial structure included in the first color forming moiety in the specific dye used as a dye for red (R) are described.

—Dye for Red (R)—

When the specific dye is use as a dye for red (R), it is preferable that $\lambda_{R1}$ be from 400 nm to 475 nm and $\lambda_{R2}$ be from 525 nm to 600 nm. $\Delta\lambda_R$ is preferably from 60 nm to 180 nm. $Abs_{R1}$ : $Abs_{R2}$ is preferably from 0.6:1 to 1:0.6.

In order to adjust $\lambda_{R1}$ to be in a range of from 400 nm to 475 nm, the first color forming moiety of the specific dye preferably includes at least one partial structure selected from the group consisting of partial structures represented by any of formulae (1) to (4).

The first color forming moiety of the specific dye may include all of a partial structure represented by formula (1), a partial structure represented by formula (2), a partial structure represented by formula (3), and a partial structure represented by formula (4). The first color forming moiety of the specific dye may include only one partial structure among the structures represented by formulae (1) to (4).

Details of the partial structure represented by formula (1), the partial structure represented by formula (2), the partial structure represented by formula (3) and the partial structure represented by formula (4) are as described above. In order to adjust $\lambda_{R1}$ to be in a range of from 400 nm to 475 nm, the partial structure represented by formula (1), the partial structure represented by formula (2), the partial structure represented by formula (3) and the partial structure represented by formula (4) are preferably as described below.

The partial structure represented by formula (1) is preferably a partial structure in which $Ar^1$ is benzene, and $Ar^2$ is benzene, pyridine, thiazole or pyrimidine.

The partial structure represented by formula (2) is preferably a partial structure in which $R^1$ is an arylthio group, $R^2$ is a hydrogen atom, an alkyl group, an aryl group or a carbonyl group, $R^3$ is a hydrogen atom, an alkyl group, an aryl group or a carbonyl group, $R^4$ is a hydrogen atom, an arylthio group, a sulfo group or a hydroxyl group, $R^5$ is a hydrogen atom, an arylthio group, a sulfo group or a hydroxyl group, $R^6$ is a hydrogen atom, an alkyl group, an aryl group or a carbonyl group, $R^7$ is a hydrogen atom, an alykl group, an aryl group or a carbonyl group, and $R^8$ is a hydrogen atom, an arylthio group, a sulfo group or a hydroxyl group.

The partial structure represented by formula (3) is preferably a partial structure in which the ring structure including a carbon atom and represented by Het 1 is isoxazole, and $A^1$ is benzene.

The partial structure represented by formula (4) is preferably a partial structure in which the ring structure including a carbon atom and represented by Het 2 is isoxazole, $R^9$ is a hydrogen atom, $R^{10}$ is a hydrogen atom, and $A^2$ is benzene.

When the specific dye is a dye for red (R), the first color forming moiety preferably includes, among the partial structure as described above, a partial structure represented by formula (1) or a partial structure represented by formula (4), and more preferably includes a partial structure represented by formula (1).

Next, preferable embodiments of a partial structure included in the second color forming moiety in the specific dye used as a dye for blue (R) are described.

In order to adjust $\lambda_{R2}$ to be in a range of from 525 nm to 600 nm, the second color forming moiety preferably includes at least one partial structure that is different from the partial structure included in the first color forming moiety and that is selected from the group consisting of partial structures represented by any of formulae (1) to (5) and partial structures derived from a phthalocyanine derivative.

The second color forming moiety of the specific dye may include all of a partial structure represented by formula (1), a partial structure represented by formula (2), a partial structure represented by formula (3), a partial structure represented by formula (4), a partial represented by formula (5) and a partial structure derived from a phthalocyanine derivative. The second color forming moiety of the specific dye may include only one partial structure among the partial structures represented by any of formulae (1) to (5) and the partial structures derived from a phthalocyanine derivative.

Details of the partial structure represented by formula (1), the partial structure represented by formula (2), the partial structure represented by formula (3), the partial structure represented by formula (4), the partial structure represented by formula (5) and a partial structure derived from a phthalocyanine derivative are as described above. In order to adjust $\lambda_{R2}$ to be in a range of from 525 nm to 600 nm, the partial structure represented by formula (1), the partial structure represented by formula (2), the partial structure represented by formula (3), the partial structure represented by formula (4), and the partial structure represented by formula (5) are preferably as described below.

The partial structure represented by formula (1) is preferably a partial structure in which $Ar^1$ is benzene and $Ar^2$ is thiazole.

The partial structure represented by formula (2) is preferably a partial structure in which $R^1$ is an amino group or an arylthio group, $R^2$ is a hydrogen atom, a carbonyl group or a cyano group, $R^3$ is a hydrogen atom, a carbonyl group or a cyano group, $R^4$ is a hydrogen atom, an amino group or an arylthio group, $R^5$ is a hydrogen atom, an amino group or an arylthio group, $R^6$ is a hydrogen atom, a carbonyl group or a cyano group, $R^7$ is a hydrogen atom, a carbonyl group or a cyano group, and $R^8$ is a hydrogen atom, an amino group or an arylthio group.

The partial structure represented by formula (3) is preferably a partial structure in which the ring structure including a carbon atom and represented by Het 1 is pyrazole or pyrrolotriazole, and $A^1$ is benzene.

The partial structure represented by formula (4) is preferably a partial structure in which the ring structure including a carbon atom and represented by Het 2 is indolenine, barbituric acid, thiobarbituric acid or pyridone, $R^9$ is a hydrogen atom or a hydroxyl group, $R^{10}$ is a hydrogen atom, and $A^2$ is benzene or indolenine.

The partial structure represented by formula (5) is preferably a partial structure in which $R^{13}$ is a hydrogen atom, an alkyl group or an aryl group, $R^{14}$ is a hydrogen atom, a halogen atom, an amino group, an alkyl group, an aryl group or a carbonyl group, $R^{15}$ is a hydrogen atom, an alkyl group or an aryl group, $R^{16}$ is a hydrogen atom, a halogen atom, an amino group, an alkyl group, an aryl group or a carbonyl group.

When the specific dye is a dye for red (R), the second color forming moiety preferably includes, among the above described partial structures, a partial structure represented by formula (1), a partial structure represented by formula (3) or a partial structure represented by formula (5), and more preferably includes a partial structure represented by formula (3).

In the specific dye used in the invention, the first color forming moiety and the second color forming moiety are bonded through a covalent bond. In the specific dyes, at least the first color forming moiety and the second color forming moieties are bonded. However, when one or more additional color forming moieties, such as a third color forming moiety and a forth color forming moiety, are also included in the specific dye, for example, a third color forming moiety may be bonded to the first or second color forming moiety through a covalent bond.

Specifically, the color forming moieties may be directly bonded through a chemical reaction. However, when the color forming moieties is directly bonded through a chemical reaction, the binding mode may sometimes be restricted in consideration of, for example, compatibilities between the color forming moieties such as reactivity. Further, in a case of a dye in which the distance from one color forming moiety to the other color forming moiety is short, synthesis of the dye which exhibits a desired color may be sometimes difficult, due to changes in color caused by shifting of the maximum absorption wavelengths to a longer wavelength side or a shorter wavelength side.

Accordingly, from the viewpoint of easy reaction and suppression of influence on the maximum absorption wavelengths of the color forming moieties, such as suppression of wavelength shift, it is preferable that the polymerizable group portion of the color forming moieties having a polymerizable group is reacted in order to cause copolymerization.

The term "color forming moiety having a polymerizable group" means a compound in which a polymerizable group is bonded to a partial structure which is to become a color forming moiety. Typical examples of the polymerizable group include an ethylenically double bond and an epoxy ring. In other words, the "color forming moiety having a polymerizable group" is a polymerizable compound having a color forming moiety. The color forming moiety having a polymerizable group may also be referred to as a "polymerizable coloring material".

The specific dye is preferably a polymer dye including at least a repeating unit having a first color forming moiety and a repeating unit having a second color forming moiety. The polymer dye can be formed by copolymerizing at least the polymerizable compounds having a color forming moiety.

When a polymer dye having the above structure is used as a specific dye, the number of a repeating unit having a first color forming moiety and the number of a repeating unit having a second color forming moiety can be easily controlled, whereby the above-described absorbance ratio $Abs_1$ : $Abs_2$ can be easily adjusted.

The repeating unit having the first color forming moiety and the repeating unit having the second color forming moiety is preferably bonded by a covalent bond formed through a radical polymerization.

Examples of a polymerizable compound having a color forming moiety include acrylate having a partial structure for forming a color forming moiety, methacrylate having a partial structure for forming a color forming moiety, styrene having a partial structure for forming a color forming moiety, acrylamide having a partial structure for forming a color forming moiety, methacrylamide having a partial structure for forming a color forming moiety, and vinylether having a partial structure for forming a color forming moiety.

When a polymer dye which is a specific dye is formed using the polymerizable compounds having a color forming moiety, each of the repeating unit having the first color forming moiety and the repeating unit having the second color forming moiety in the specific dye has, for example, a polyacrylate repeating structure, a polymethacrylate repeating structure, a polystyrene repeating structure, a polyacrylamide repeating structure, a polymethacrylamide repeating structure or a polyvinylether peating structure.

Taking as an example, the first color forming moiety and the second color forming moiety may be bonded through at least one repeating structure selected from the group consisting of polyacrylate repeating structures, polymethacrylate repeating structures, polystyrene repeating structures, polyacrylamide repeating structures, polymethacrylamide repeating structures and polyvinylether peating structures.

Hereinbelow, exemplary pomerizable compounds having a color forming moiety (polymerizable coloring material) Y-1 to Y-9, M-1 to M-6 and C-1 to C-4, which may be preferably used for synthesis of a polymer dye, are shown. Polymerizable compounds Y-1 to Y-9 each are a polymerizable yellow coloring material, polymerizable compounds M-1 to M-6 each are a polymerizable magenta coloring material, and polymerizable compounds C-1 to C-4 each are a polymerizable cyan coloring mterial.

The polymerizable compound having a color forming moiety which may be used for a synthesis of a specific dye is not limited to the following specific exemplary compounds.

The numerical value in the parenthesis placed below each of the specific exemplary compounds indicates a maximum absorption wavelength λmax obtained measuring a 0.005% by mass solution of each of the specific exemplary compounds in methylene chloride by spectrophotometric measurement at 25° C. using a quartz cell of 1 cm and a UV/vis spectrophotometer UV3400 (trade name; manufactured by Shimadzu Corporation).

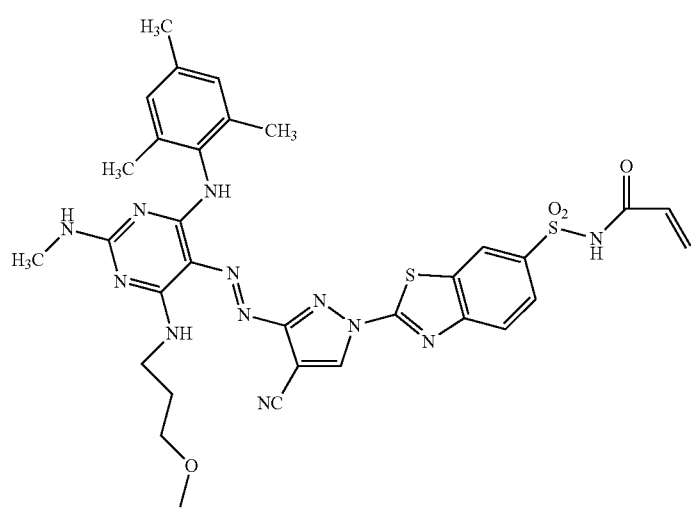
[λ max = 440 nm]
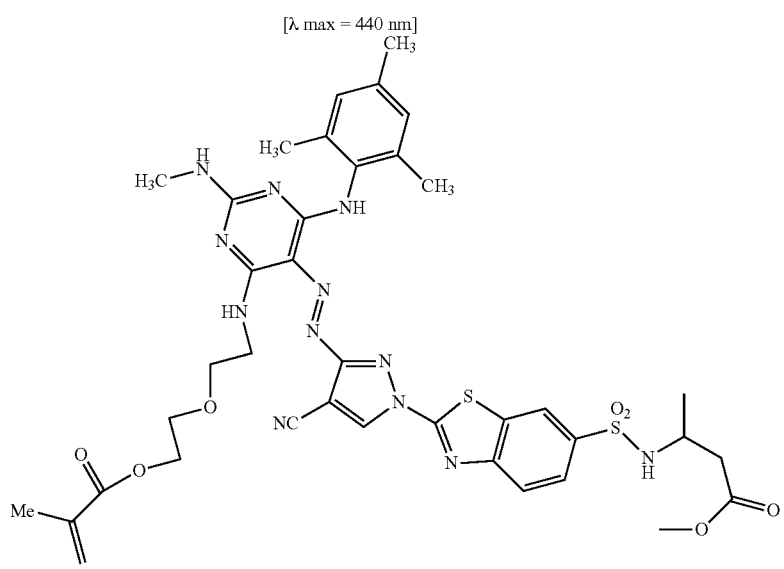
[λ max = 438 nm]
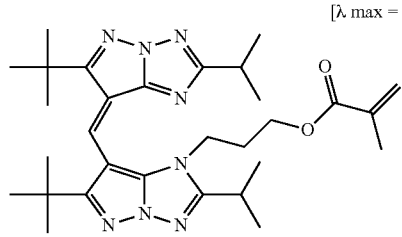
[λ max = 420 nm]
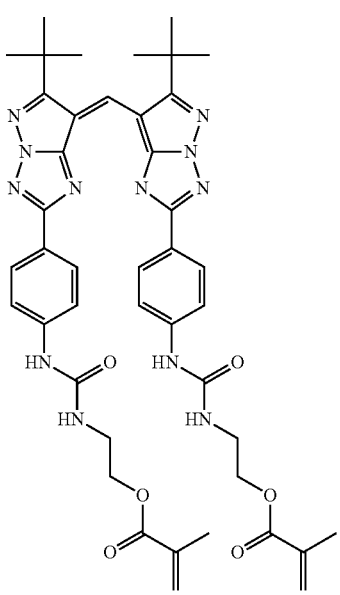
[λ max = 430 nm]

-continued
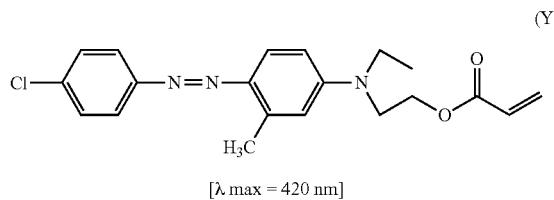
(Y-5) [λ max = 420 nm]
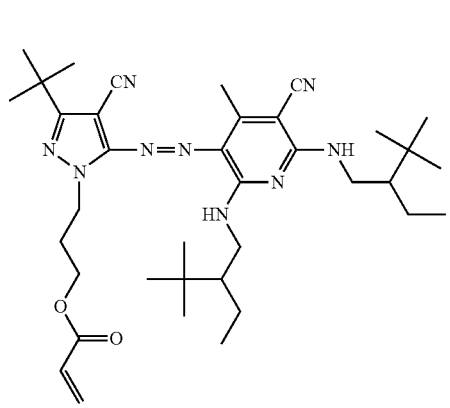
(Y-6) [λ max = 484 nm]
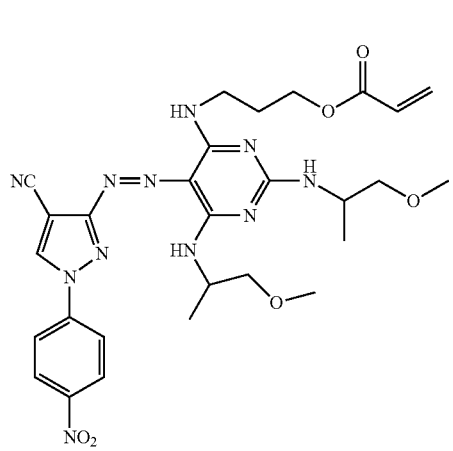
(Y-7) [λ max = 480 nm]
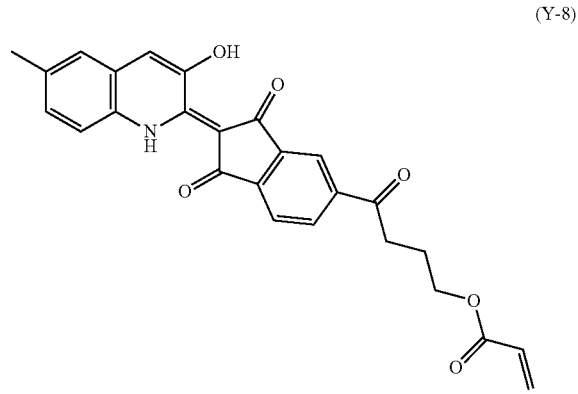
(Y-8) [λ max = 435 nm]
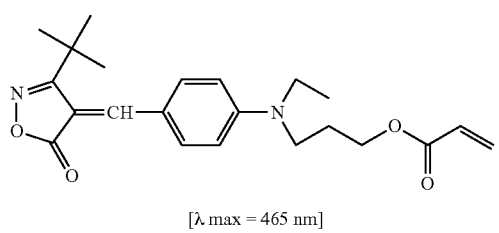
(Y-9) [λ max = 465 nm]
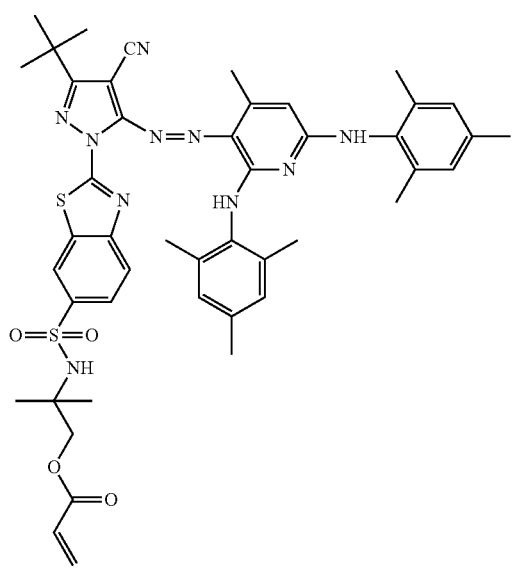
(M-1) [λ max = 522 nm]

-continued
(M-2)
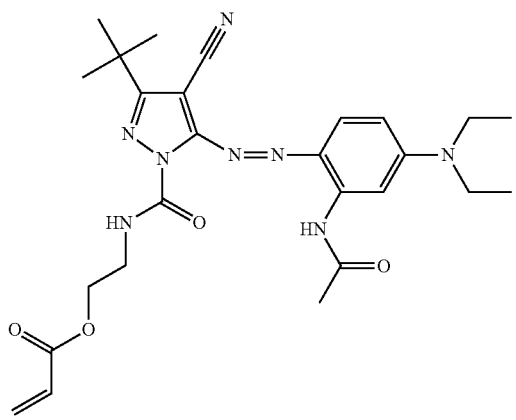
[λ max = 548 nm]
(M-3)
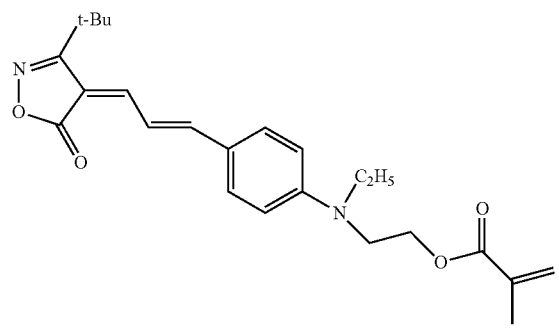
[λ max = 526 nm]
(M-4)
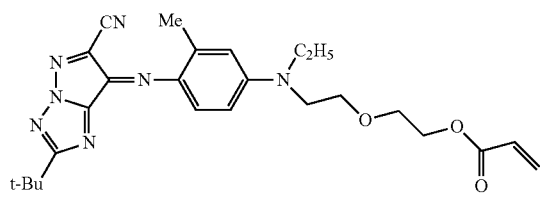
[λ max = 545 nm]
(M-5)
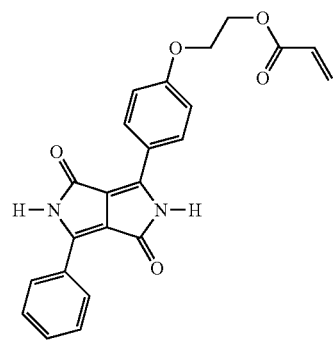
[λ max = 510 nm]
(M-6)
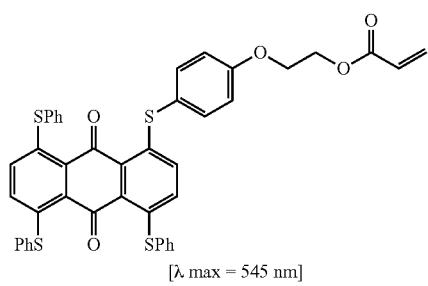
[λ max = 545 nm]
(C-1)
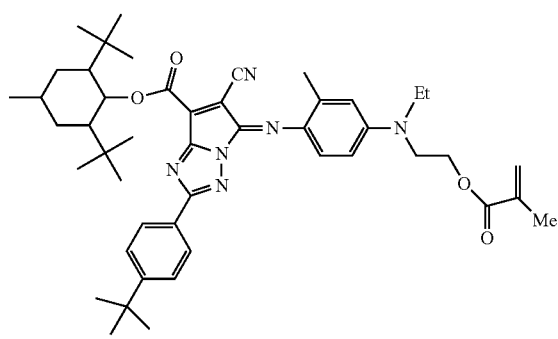
[λ max = 638 nm]
(C-2)
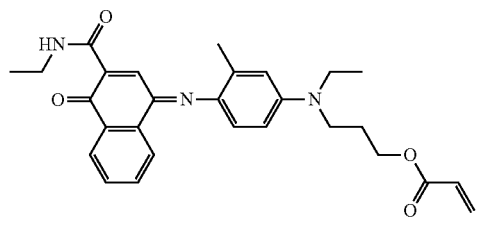
[λ max = 670 nm]
(C-3)
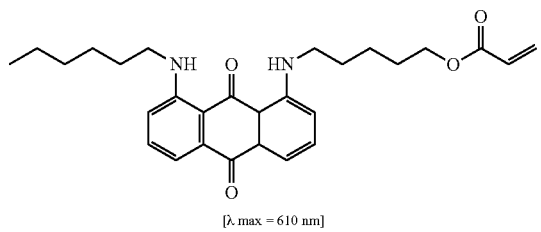
[λ max = 610 nm]

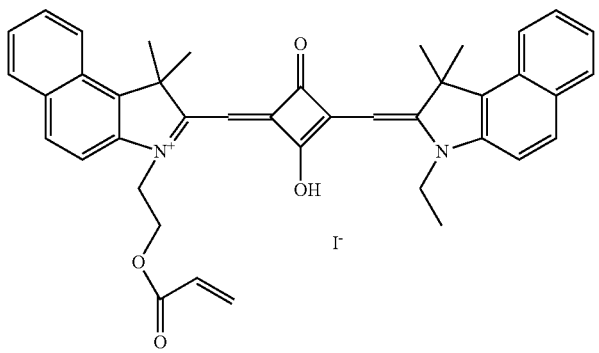

(C-4)

[λ max = 670 nm]

The electrophoretic composition of the present invention includes a non-water-soluble dispersion medium which is described below. Accordingly, the polymer dye preferably includes, in addition to the repeating units having a color forming moiety, a repeating unit derived from a non-water-soluble polymerizable compound in order to enhance solubility of the specific dye in non-water-soluble dispersion medium. From the viewpoint of enhancing solubility of the specific dye in the non-water-soluble dispersion medium, the ratio of repeating units derived from a non-water-soluble polymerizable compound in the polymer dye is preferably from 5% by mass to 95% by mass, more preferably from 20% by mass to 80% by mass, and further preferably from 30% by mass to 70% by mass, with respect to the total mass of the polymer dye.

Examples of a non-water-soluble polymerizable compound which may be used to form a repeating unit derived from the non-water-soluble polymerizable compound include alkylacrylate, alkylmethacylate, styrene, acrylamide, methacrylamide and vinylether.

Among the above, the non-water-soluble polymerizal compound is preferably alkyl(meth)acrylate having from 1 to 10 carbon atoms in the alkyl group of the ester portion thereof.

The polymer dye is preferably produced by subjecting at least a polymerizable compound having a first color forming moiety and a polymerizable compound having a second color forming moiety to radical polymerization, and more preferably produced by subjecting at least a polymerizable compound having a first color forming moiety, a polymerizable compound having a second color forming moiety and a non-water-soluble polymerizable compound to radical polymerization.

From the viewpoint of adjusting the ratio ($Abs_1:Abs_2$) of an absorbance $Abs_1$ at the maximum absorption wavelength of the first color forming moiety to an absorbance $Abs_2$ at the maximum absorption wavelength of the second color forming moiety is in a range of from 0.5:1 to 1:0.5, the ratio of the amount of the polymerizable compound having a first color forming moiety to the amount the polymerizable compound having a second color forming moiety (the mass of the polymerizable compound having a first color forming moiety: the mass of the polymerizable compound having a second color forming moiety) is preferably adjusted to be in a range of from 0.5:1 to 1:0.5, and more preferably in a range of from 0.6:1 to 1:0.6.

The weight average molecular weight (Mw) of the polymer dye is preferably from 2,000 to 1,000,000, more preferably from 4,000 to 500,000, and further preferably from 5,000 to 100,000.

Preferable examples of combinations of polymerizable compounds having a color forming moiety for forming a dye for green, blue or red, combinations of coloring materials and a non-water-soluble polymerizable compound, the ratio of amount (based on mass), the polymer dyes obtained by radical polymerization of these polymerizable compounds and the weight average molecular weight (Mw) thereof are shown in Table 1.

TABLE 1

| | Polymer Dye | Polymerizable compound having a color forming moiety | | Non-water-soluble polymeriable compound | Amount ratio (% by mass) | | | Mw |
|---|---|---|---|---|---|---|---|---|
| | | x | y | z | x | y | z | |
| Dye for Green (G) | PG-1 | Y-1 | C-1 | n-butyl methacrylate | 20 | 30 | 50 | 55,000 |
| | PG-2 | Y-2 | C-1 | n-butyl methacrylate | 25 | 25 | 50 | 52,000 |
| | PG-3 | Y-1 | C-4 | n-butyl methacrylate | 20 | 20 | 60 | 68,000 |
| | PG-4 | Y-2 | C-4 | methyl methacrylate | 20 | 20 | 60 | 62,000 |
| Dye for Blue (B) | PB-1 | M-1 | C-1 | n-butyl methacrylate | 30 | 35 | 35 | 48,000 |
| | PB-2 | M-4 | C-1 | n-butyl methacrylate | 35 | 35 | 30 | 62,000 |
| | PB-3 | M-1 | C-4 | methyl acrylate | 25 | 25 | 50 | 32,000 |
| | PB-4 | M-4 | C-4 | metyl acrylate | 35 | 40 | 25 | 38,000 |
| Dye for Red (R) | PR-1 | Y-1 | M-1 | n-butyl methacrylate | 25 | 25 | 50 | 48,000 |
| | PR-2 | Y-2 | M-1 | n-butyl methacrylate | 20 | 30 | 50 | 52,000 |
| | PR-3 | Y-1 | M-4 | n-butyl methacrylate | 25 | 35 | 40 | 54,000 |
| | PR-4 | Y-2 | M-4 | n-butyl methacrylate | 30 | 35 | 35 | 78,000 |

The content amount of the specific dye in the electrophoretic composition of the present invention is preferably from 0.01% by mass to 50% by mass, more preferably from 0.1% by mass to 20% by mass, and further preferably from 0.5% by mass to 10% by mass, with respect to the total mass of the electrophoretic composition.

[Non-Water-Soluble Dispersion Medium]

The electrophoretic composition of the present invention includes at least one non-water-soluble dispersion medium.

The non-water-soluble dispersion medium is preferably a non-water-soluble dispersion medium which dissolves a specific dye and does not dissolve charged particles described below.

Examples of the non-water-soluble dispersion medium include n-hexanen, n-octane, diisopropyl naphthalene, ISOPAR (trade name, manufactured by Exxon Mobil Corporation) and silicone oil. More preferable examples thereof include diisopropyl naphthalene and ISOPAR. The dispersion medium may be composed of only one kind of these, or may be composed of a mixture of two or more kinds thereof.

The content amount of the non-water-soluble dispersion medium in the electrophoretic composition of the present invention is preferably from 10% by mass to 100% by mass, more preferably from 30% by mass to 100% by mass, and further preferably from 40% by mass to 90% by mass, with respect to the total mass of the electrophoretic composition.

[Charged Particles]

The electrophoretic composition of the present invention includes at least one kind of charged particles.

The charged particles act as positively charged particles or negatively charged particles. In other words, the electrophoretic composition includes positively charged particles, negatively charged particles or both positively charged particles and negatively charged particles, and preferably includes both of positively charged particles and negatively charged particles. When the positively charged particles and the negatively charged particles coexist, the positively charged particles and the negatively charged particles may form aggregates. Therefore, in the case where the two-differently charged particles are combined, either positively charged particles or negatively charged particles are preferably combined with uncharged particles.

The color of the charged particles is not specifically restricted. However, the charged particles are preferably white or black. When positively charged particles and negatively charged particles are used, either the positively charged particles or the negatively charged particles is preferably black and the other is preferably white. In other words, it is preferable that when the positively charged particles are black, the negatively charged particles are white, while it is also preferable that when the positively charged particles are white, the negatively charged particles are black.

The color of the uncharged particles is not specifically restricted. When positively charged particles and negatively charged particles are used, it is preferable that the uncharged particles have the same color as either the positively charged particles or the negatively charged particles. In another embodiment, a part of the uncharged particles may have the same color as the positively charged particles and the rest of the uncharged particles may have the same color as the negatively charged particles.

Examples of white particles include metal oxide particles such as titanium oxide particle, silicon oxide particles, zinc oxide particles, and tin oxide particles. One kind of these particles may be used, or two or more types of these particles may be used as a mixture. Among these, titanium oxide particles are preferable.

Examples of black particles include black pigment particles such as carbon black particles, manganese ferrite black particles, and titanium black particles. One kind of these particles may be used, or two or more kinds thereof may be used as a mixture. Among these, carbon black particles are preferable.

Examples of a method of positively charging, negatively charging or not charging white particles or black particles include a method in which a cationic polymer, an anionic polymer or a nonionic polymer is physically adsorbed to the particles, and a method in which the surfaces of the particles are chemically modified using an alkoxysilane having a cationic group, an alkoxysilane having an anionic group or an alkoxysilane having a nonionic group.

Positively charged particles may be obtained by, for example, physically adsorbing a cationic polymer having a cationic group onto the particles, or chemically modifying a surface of the particles with an alkoxysilane having a cationic group.

Examples of the cationic group include a primary amino group, a secondary amino group, a tertiary amino group or a quarternary ammonium salt group.

Negatively charged particles may be obtained by, for example, physically adsorbing an anionic polymer having an anionic group onto the particles, or chemically modifying a surface of the particles with an alkoxysilane having an anionic group.

Examples of the anionic group include a carboxyl group, a sulfonic group, a carboxylate salt group, a solfonate salt group.

Uncharged particles may be obtained by, for example, physically adsorbing a nonionic polymer onto the particles, or chemically modifying a surface of the particles with an alkoxysilane having a nonionic group.

Examples of the nonionic group include a hydroxyl group, an amide group (in which the nitrogen atom is unsubstituted) and an alkylether group represented by $—(R—O)_n—H$ wherein R represents an alkyl group and n represents a repeating unit number.

Only one polymer may be used, or two or more polymers may be used in combination, for physical adsorption onto the particles. Only one alkoxysilane may be used, or two or more alkoxysilanes may be used in combination, for chemically modifying a surface of the particles.

As the charged particles, commercially available particles may be used.

The content amount of the charged particles in the electrophoretic composition of the present invention is preferably from 1% by mass to 80% by mass, and more preferably from 5% by mass to 60% by mass, with respective to the total mass of the electrophoretic composition. When the content amount of the charged particles is 5% by mass or more, electrophoresis display with a high contrast ratio can be realized, and when the content amount of the charged particles is 80% by mass or less, color electrophoresis display with a low driving voltage and a high response speed can be realized.

<Microcapsules and Electrophoretic Display Device>

The microcapsules of the present invention include an electrophoretic composition of the present invention.

The electrophoretic display device of the present invention includes a first substrate having a first electrode, a microcapsule layer including microcapsules of the present invention, and a second substrate having a second electrode in this order. In other words, in the electrophoretic display device of the present invention, the microcapsule layer is disposed between the first substrate having a first electrode and a second substrate having a second electrode. The first substrate side or the second substrate side may be used as a display side.

When using microcapsules incorporating therein an electrophoretic composition of the present invention, an electrophoretic display device can be easily obtained simply by closely packing the microcapsules between the substrate.

The microcapsules in which the electrophoretic composition of the present invention is encapsulated can be obtained by, for example, an interfacial polymerization method, an in situ polymerization method, or a coacervation method.

These methods are described in "Microcapsules, Functions and Application thereof, edited by Tamotsu Kondo, Japan Standard Association, March, 1991 in detail.

For forming microcapsules, a material which sufficiently transmits light may be preferably used, and examples of such a material include urea-formaldehyde resins, melamine-formaldehyde resins, polyester, polyurethane, polyamide, polyethylene, polystyrene, polyvinyl alcohol, gelatin, and copolymers thereof. The method of disposing the microcapsules between the substrates is not particularly limited, and a nozzle of inkjet system may be used.

The method for filling the electrophoretic composition of the invention into the microcapsules is not particularly limited. In order to fill the electrophoretic composition into the microcapsules, usually, capillary action may be utilized. A nozzle of inkjet system may also be used.

The Material used for the first substrate having a first electrode and the material used for the second material having a second electrode each are not particularly limited. For the substrate which is disposed at the display side, a transparent material may be used, and examples thereof include glass and plastics. The material used for the substrate disposed at the non-display side is not necessarily transparent, and examples thereof include metals and plastics.

Examples of plastics which may be used include acrylic resins, epoxy resins, fluorine resins, silicone resins, polyimide resins, polystyrene resins, polyalkene resins, alkyd resins, polyester resins (for example, PET or PEN).

Examples of the first electrode and the second electrode, which may be the same or different from one another, include a vapor-deposited-metal film of, for example, indium tin oxide (ITO), tin oxide, indium oxide, gold or chromium. When the electrode is formed in a form of pattern, a method such as photolithography may be used.

In the electrophoretic display device of the present invention, when a negative voltage is applied to one electrode and a positive voltage is applied to the other electrode, the positively charged electrophoretic particles move toward the negative electrode so as to coat the negative electrode. When viewing the display device from the negative electrode side, the color of the electrophoretic particles can be seen. When the voltage applied to each of the electrodes is reversed, the color of the dispersion medium or another kind of electrophoretic particles can be seen. When such a voltage driving is carried out in a number of arranged pixel units, any images and characters can be displayed.

EXAMPLES

Hereinbelow, the present invention is specifically described with reference to Examples, but the present invention is not limited to the following Examples. In the following examples, the expression "%" used for a content ratio and the expression "part(s)" are based on mass.

First, synthesis examples of polymer dyes (PG-1 and PG-2) for green, each of which is a specific dye for green (G), are described.

Synthesis Example 1

Synthesis of Polymer Dye (PG-1) for Green

As shown in the following synthesis scheme, 0.70 g of polymerizable yellow coloring material Y-1 as a polymerizable compound having a first color forming moiety, 0.75 g of polymerizable cyan coloring material C-1 as a polymerizable compound having a second color forming moiety, 2.7 g of butyl methacrylate (S-1) which is a non-water-soluble polymerizable compound, and 0.5 ml of pyropylene glycol methyl ether-2-acetate were mixed, and the mixture was heated and stirred at 80° C. under nitrogen atmosphere. Further, 50 mg of a polymerization initiator, azobisisobutyronitrile (AIBN), was added to the mixture, and the resulting mixture was stirred at 80° C. for 6 hours to perform a radical polymerization reaction. Thus, a reaction liquid was obtained.

After the obtained reaction liquid was cooled, 50 ml of methanol was added to the cooled reaction liquid, and a deposited solid was separated by filtration. The obtained solid was dissolved in tetrahydrofuran (THF), and thereafter, methanol was added to the THF solution to cause crystallization. Thus, 1.6 g of polymer dye PG-1 for green having a structure as shown below was obtained as a target.

In polymer dye PG-1 for green, the ratio x:y:z is 20:30:50 based on mass. The weight average molecular weight of polymer dye PG-1 for green is 55,000.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio $Abs_1:Abs_2$ of polymer dye PG-1 for green are shown in Table 2.

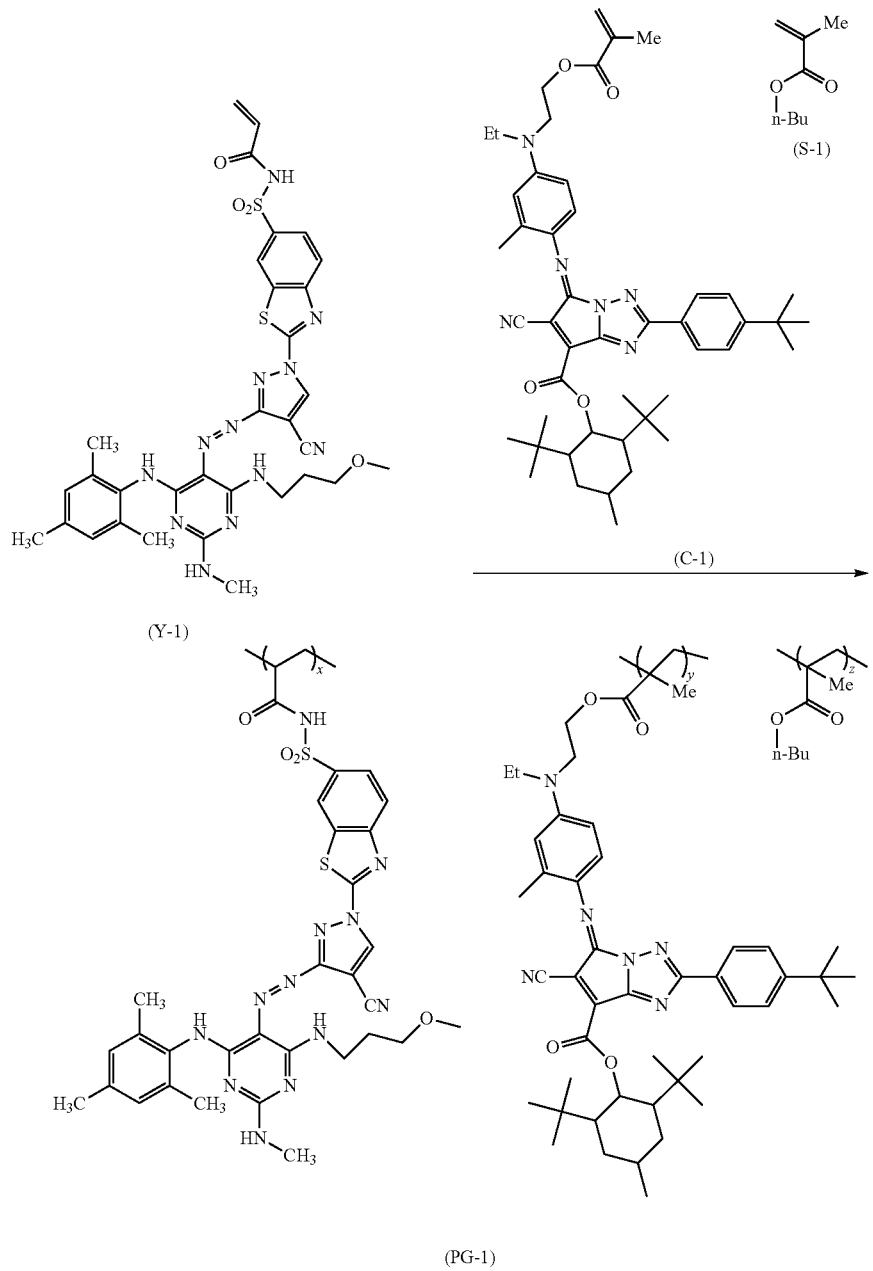

With respect to a 0.005% by mass solution of the thus obtained polymer dye PG-1 for green dissolved in methylene chloride, spectrophotometric measurement was performed at room temperature (25° C.) using a quartz cell of 1 cm and a UV/vis spectrophotometer UV3400 (trade name, manufacture by Shimadzu Corporation). The graph obtained by plotting the absorption wavelengths are shown in FIG. 1.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio $Abs_1:Abs_2$ of polymer dye PG-1 for green shown in Table 2 are values obtained by the above described measurement method.

Synthesis Example 2

Synthesis of Polymer Dye (PG-2) for Green 1.8 g of polymer dye PG-2 for green having a structure as shown below was obtained by radical polymerization in the substantially same manner as the synthesis of polymer dye PG-1 for green in Synthesis Example 1 except that 0.70 g of polymerizable yellow coloring material Y-2 as a polymerizable compound having a first color forming moiety was used in place of 0.70 g of polymerizable yellow coloring material Y-1 as a polymerizable compound having a first color forming moiety.

In polymer dye PG-2 for green, the ratio x:y:z is 25:25:50 based on mass. The weight average molecular weight of polymer dye PG-2 for green was 52,000.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio $Abs_1$:$Abs_2$ of polymer dye PG-2 for green are shown in Table 2.

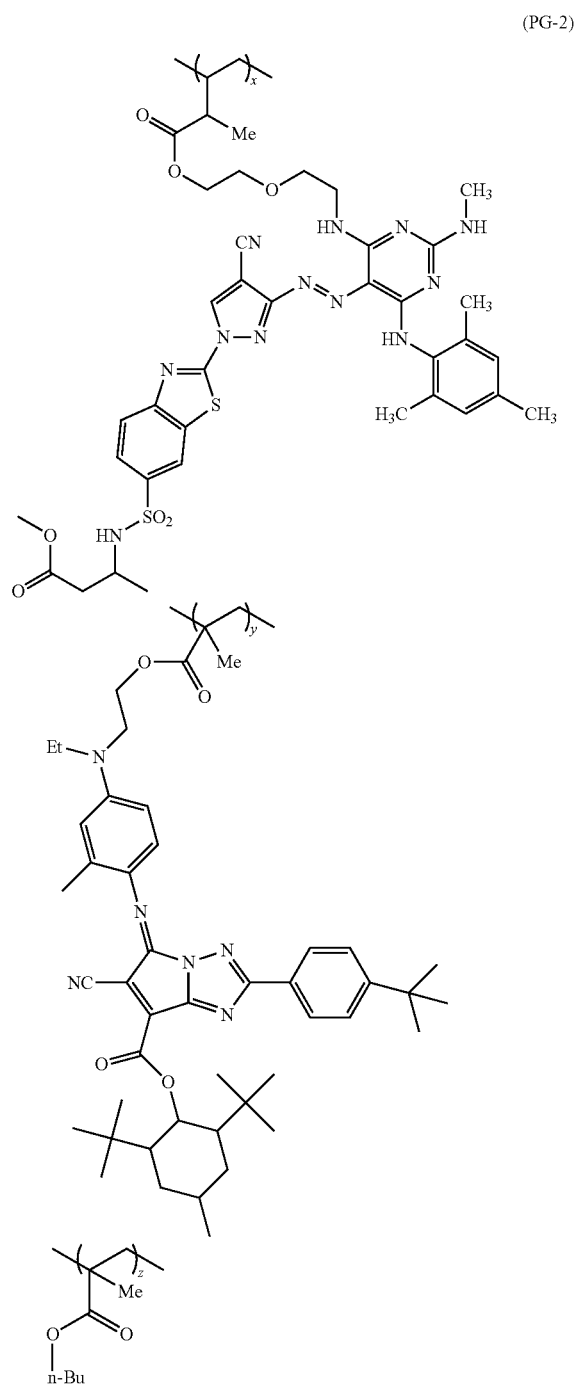

(PG-2)

Synthesis Example 3

Synthesis of Polymer Dye (PB-1) for Blue 1.3 g of polymer dye PB-1 for blue having a structure as shown below was obtained in the substantially same manner as the synthesis of polymer dye PG-1 for green in Synthesis Example 1, except that 0.8 g of polymerizable magenta coloring material M-1 was used in place of 0.70 g of polymerizable yellow coloring material Y-1.

In polymer dye PB-1 for blue, the ratio x:y:z is 30:35:35 based on mass. The weight average molecular weight of polymer dye PB-1 for blue was 48,000.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio $Abs_1$:$Abs_2$ of polymer dye PB-1 for blue are shown in Table 2.

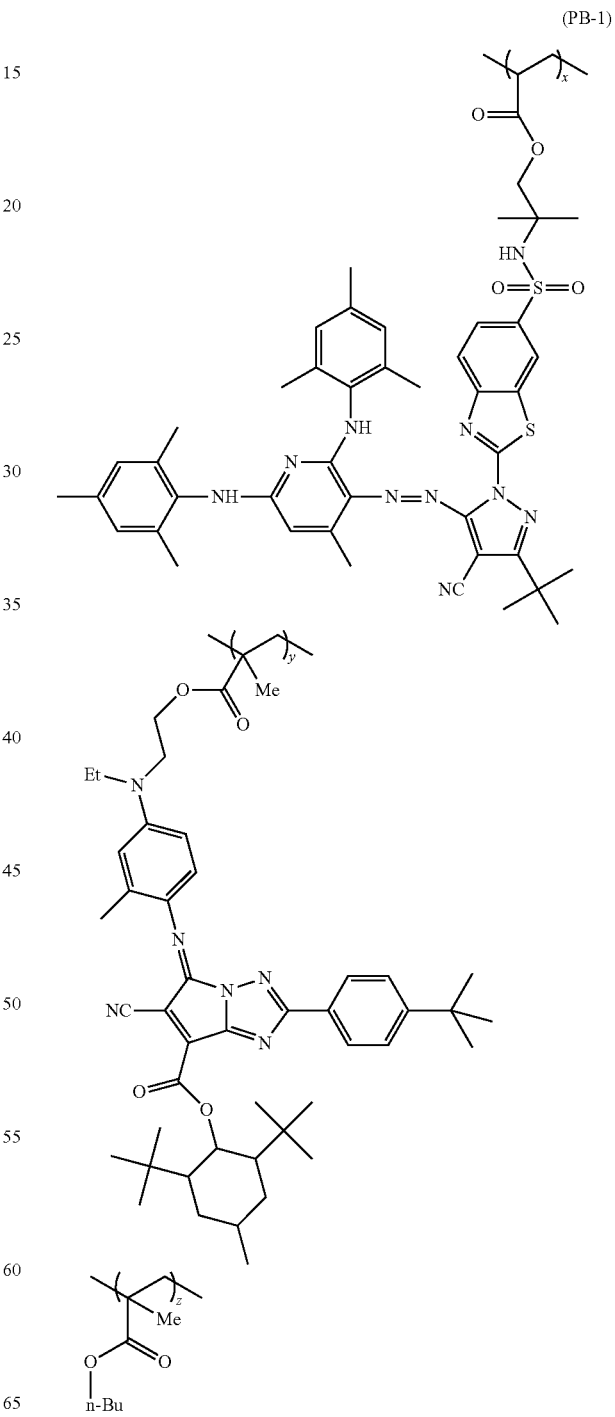

(PB-1)

Synthesis Example 4

Synthesis of Polymer Dye (PB-2) for Blue 1.5 g of polymer dye PB-2 for Blue having a structure as shown below was obtained in the substantially same manner as the synthesis of polymer dye PG-1 for green in Synthesis Example 1, except that 0.8 g of polymerizable magenta coloring material M-4 was used in place of 0.70 g of polymerizable yellow coloring material Y-1.

In polymer dye PB-2 for blue, the ratio x:y:z is 35:35:30 based on mass. The weight average molecular weight of polymer dye PB-2 for blue was 62,000.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio $Abs_1:Abs_2$ of polymer dye PB-2 for blue are shown in Table 2.

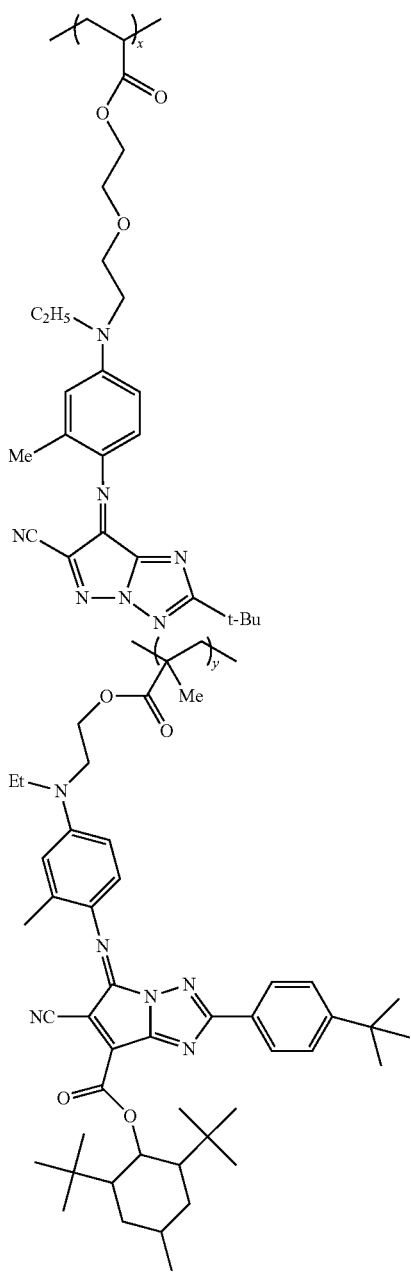

(PB-2)

Synthesis Example 5

Synthesis of Polymer Dye (PR-1) for Red 1.5 g of polymer dye PR-1 for red having a structure as shown below was obtained in the substantially same manner as the synthesis of polymer dye PG-1 for green in Synthesis Example 1, except that 0.75 g of polymerizable magenta coloring material M-1 was used in place of 0.75 g of polymerizable cyan coloring material C-1.

In polymer dye PR-1 for red, the ratio x:y:z is 25:25:50 based on mass. The weight average molecular weight of polymer dye PR-1 for red was 48,000.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio $Abs_1:Abs_2$ of polymer dye PR-1 for red are shown in Table 2.

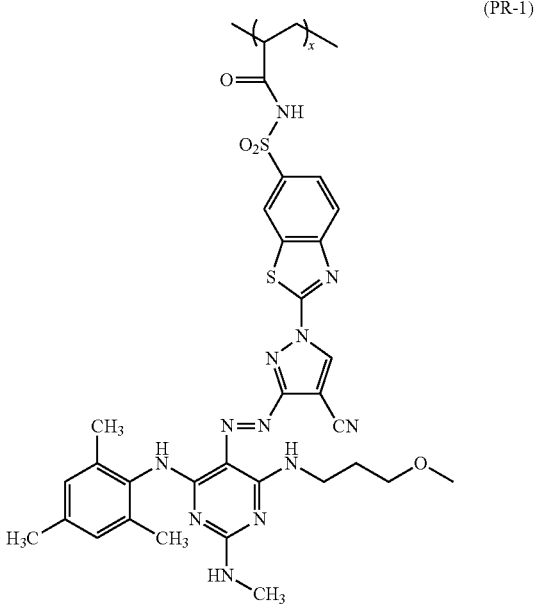

(PR-1)

-continued

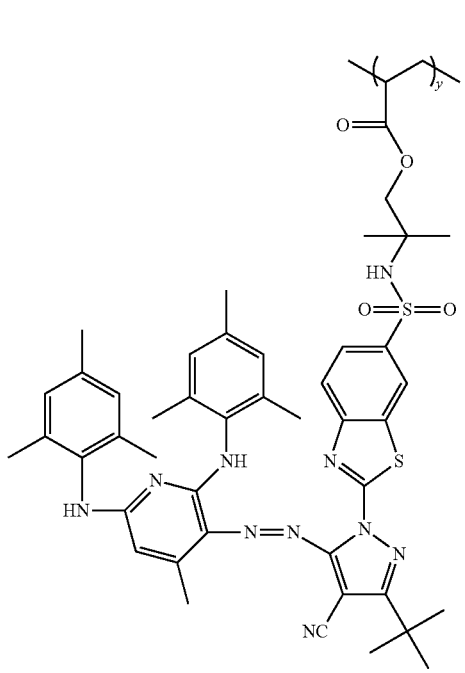

Synthesis Example 6

Synthesis of Polymer Dye (PR-2) for Red 1.7 g of polymer dye PR-2 for red having a structure as shown below was obtained in the substantially same manner as the synthesis of polymer dye PG-1 for green in Synthesis Example 1, except that 0.80 g of polymerizable magenta coloring material M-1 was used in place of 0.75 g of polymerizable cyan coloring material C-1.

In polymer dye PR-2 for red, the ratio x:y:z is 20:30:50 based on mass. The weight average molecular weight of polymer dye PR-2 for red was 52,000.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio $Abs_1:Abs_2$ of polymer dye PR-2 for red are shown in Table 2.

<Production of Charged Particles>

Spherical black charged particles of carbon-containing crosslinked polymethyl methacrylate (TECHPOLYMER MBX-BLACK, manufactured by Sekisui Plastics Co., Ltd.) having a volume-average primary particle diameter of 10 μm to which AEROSIL 130 powder treated with aminopropyltrimethoxysilane has been added and spherical white charged particles of titanium oxide-containing crosslinked polymethyl methacrylate (TECHPOLYMER MBX-WHITE, manufactured by Sekisui Plastics Co., Ltd.) having a volume-average primary particle diameter of 10 μm to which titania powder treated with isopropyl trimethoxysilane has been added were used. These particles were mixed in a mass ratio of the black charged particles to the white charged particles (black charged particles: white charged particles) of about 3:5. By the friction caused among the particles, the black charged particles (carbon black: CB) were positively charged, while the white charged particles (TiO$_2$) were negatively charged.

<Production of Non-Water-Soluble Dispersion Medium>

Mixed solvent 1 was obtained by dissolving 0.01 g of SPAN 86 (manufactured by Wako Pure Chemical Industries, Ltd.) in 2.89 g of ISOPAR G (manufactured by Exxon Mobil Corporation), and was used as a non-water-soluble dispersion medium in Examples 1 to 6.

Example 1

In 2.9 g of mixed solvent 1 (non-water-soluble dispersion medium), 2.0 g of the white charged particles, 0.1 g of the black charged particles and 0.3 g of polymer dye PG-1 for green were added, and the resulting mixture was subjected to ultrasonic application for 20 minutes while temperature thereof being raised to 40° C., whereby electrophoretic composition 1 of Example 1 was prepared.

Examples 2 to 6

Each of electrophoretic compositions 2 to 6 of Examples 2 to 6 was prepared in the substantially same manner as the production of electrophoretic composition 1 of Example 1, except that a specific dye as shown in Table 2 was used in place of polymer dye PG-1 for green.

Comparative Example 1

In accordance with the method of Example 1 described in paragraphs [0095] to [0096] of Japanese Application National Phase Publication No. 2010-534746, polymer dye P-101 for comparison was obtained.

Specifically, 1.5 g of polymer dye P-101 having a structure as shown below was obtained in the substantially same manner as the preparation of polymer dye PG-1 for green in Synthesis Example 1, except that an adduct of dispersion orange 3 (manufactured by Sigma-Aldrich) and chloroethyl acrylate was used in place of polymerizable cyan coloring material C-1, and dispersion red 1 acrylate (manufactured by Sigma-Aldrich) was used in place of polymerizable yellow coloring material Y-1; and vinyl imidazole was used in place of butyl methacylate (S-1).

In polymer dye P-101 for red, the ratio x:y:z is 25:25:50 based on mass. The weight average molecular weight of polymer dye P-101 for red was 55,000.

The maximum absorption wavelength $\lambda_1$ of the first color forming moiety, the maximum absorption $\lambda_2$ of the second color forming moiety, the difference $\Delta\lambda$ between $\lambda_1$ and $\lambda_2$, and the absorbance ratio Abs$_1$:Abs$_2$ of polymer dye PR-2 for red are shown in Table 2.

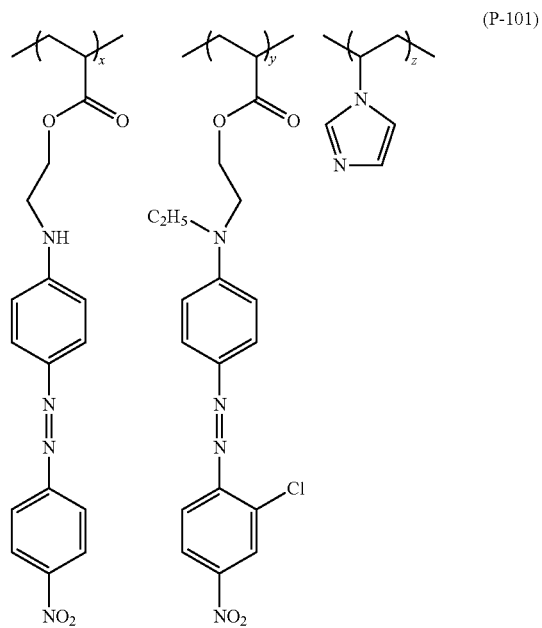

(P-101)

Next, electrophoretic composition 101 was prepared in the substantially same manner as the preparation of electrophoretic composition 1 in Example 1, except that comparative polymer dye P-101 was used in place of polymer dye PG-1 for green and ethylene glycol as a water-soluble dispersion medium was used in place of the non-water-soluble dispersion medium.

Comparative Example 2

Synthesis of Comparative Dye for Green (P-102)

0.15 g of polymerizable cyan coloring material C-1 and 0.15 of polymerizable yellow coloring material Y-1 are respectively prepared as a cyan coloring material and a yellow coloring material. These two coloring materials are mixed without polymerization, thereby obtaining comparative dye for green P-102. Unlike polymer dye PG-1 for green, which is a polymer coloring material compound, comparative dye P-102 is a coloring material composition in which two monomer coloring materials are mixed.

The maximum absorption wavelength of polymerizable yellow coloring material Y-1, which is a component of green coloring material P-102, was designated as $\lambda_1$, and the maximum absorption wavelength of polymerizable cyan coloring material C-1, which is a component of green coloring material P-102, was designated as $\lambda_2$. $\Delta\lambda$ was calculated as a difference between $\lambda_1$ and $\lambda_2$. $\lambda_1$, $\lambda_2$ and $\Delta\lambda$ are shown in Table 2. The absorbance ratio Abs$_1$:Abs$_2$ is a ratio of the absorbance of polymerizable yellow coloring material Y-1 to the absorbance of polymerizable cyan coloring material C-1.

Next, electrophoretic composition 102 of Comparative Example 2 was prepared in the substantially same manner as in the production of electrophoretic composition 1 in Example 1, except that, comparative dye P-102 was used in place of polymer dye PG-1 for green.

<Evaluation of Transparency of Electrophoretic Composition>

With respect to each of the obtained electrophoretic compositions 1 to 6 and electrophoretic compositions 101 and 102, the transparency of the composition was evaluated by measuring absorption spectrum at each of a white state and a colored state using a UV/vis spectrophotometer UV3400 (manufactured by Shimadzu Corporation). The evaluation results are shown in Table 2. The evaluation criteria are shown below.

Evaluation Criteria
A: No coloration is found at the white state.
B: Coloration is slightly found at the white state.
C: Coloration is non-uniformly found at the white state.
D: Entire coloration is found at the white state.

TABLE 2

Composition of Electrophoretic composition

| | | Specific dye/Comparative dye | | | | | Positively charged particles | | Negatively charged particles | | Dispersion medium | | Evaluation |
|---|---|---|---|---|---|---|---|---|---|---|---|---|---|
| | color | kind | $\lambda_1$ nm | $\lambda_2$ nm | $\Delta\lambda$ nm | $Abs_1:Abs_2$ | amount % | kind | amount % | kind | amount % | Kind | amount % | Transparency |
| Example 1 | G | PG-1 | 440 | 638 | 198 | 0.55:0.45 | 6 | CB | 2 | $TiO_2$ | 38 | non-water-soluble | 54 | A |
| Example 2 | G | PG-2 | 438 | 638 | 200 | 0.50:0.50 | 6 | CB | 2 | $TiO_2$ | 38 | non-water-soluble | 54 | A |
| Example 3 | B | PB-1 | 522 | 638 | 116 | 0.45:0.55 | 6 | CB | 2 | $TiO_2$ | 38 | non-water-soluble | 54 | A |
| Example 4 | B | PB-2 | 545 | 638 | 93 | 0.50:0.50 | 6 | CB | 2 | $TiO_2$ | 38 | non-water-soluble | 54 | A |
| Example 5 | R | PR-1 | 440 | 522 | 82 | 0.40:0.60 | 6 | CB | 2 | $TiO_2$ | 38 | non-water-soluble | 54 | A |
| Example 6 | R | PR-2 | 438 | 545 | 107 | 0.35:0.65 | 6 | CB | 2 | $TiO_2$ | 38 | non-water-soluble | 54 | A |
| Comparative Example 1 | R | P-101 | 443 | 517 | 74 | 0.45:0.55 | 6 | CB | 2 | $TiO_2$ | 38 | water-soluble | 54 | D |
| Comparative Example 2 | G | P-102 | 440 | 638 | 198 | 0.60:0.40 | 6 | CB | 2 | $TiO_2$ | 38 | non-water-soluble | 54 | C |

Based on the results shown in Table 2, it is expected that when the electrophoretic composition using a specific dye is used in an electrophoretic display device, an electrophoretic display device exhibiting high transparency and favorable contrast can be obtained.

<Preparation of Microcapsule Liquid and Production of Electrophoretic Display Device>

Using electrophoretic compositions 1 to 6 of Examples 1 to 6, microcapsules 1 to 6 are respectively produced. Using microcapsules 1 to 6 thus obtained, electrophoretic display devices 1 to 6 are respectively produced. Details are described below.

—Preparation of Microcapsules—

To a 100 ml container equipped with a stirrer, a dripping funnel and a pH meter, 1.7 g of gelatin was placed, and, further, 31.7 g of deionized water was added thereto to dissolve the gelatin. The mixture was slowly stirred so as not to mix up bubbles while elevating the temperature thereof to 40° C., and the electrophoretic composition (electrophoretic compositions 1 to 6) was added to the mixture over 15 minutes through a dripping funnel. After the completion of the dripping of the electrophoretic composition, the stirring was further continued for 30 minutes.

Thereafter, into the thus obtained mixture, a mixture composed of 1.7 g of gum arabic dissolved in 8.2 g of deionized water was further added, and further a pH of the resultant mixture was adjusted to 4 using a 10% by mass aqueous solution of acetic acid. The resulting mixture was then cooled to 10° C., and 0.8 ml of a 25% by mass aqueous solution of glutar aldehyde was further added. The temperature of the resulting mixture was lowered slowly to room temperature and stirring was continued for 3 hours.

Thereafter, the obtained mixture was left for one night, and then, a supernatant portion was removed by decantation. Further, 30 g of deionized water was added, the mixture was stirred slowly and then left, and then a supernatant portion was removed by decantation. Thereafter, 10 g of a 5% by mass solution of polyvinyl alcohol (PVA 217, manufactured by Kuraray Co., Ltd.) was added and a pH of the resulting mixture was adjusted to 7.5 using a 1% by mass aqueous solution of ammonia, thereby preparing a microcapsule liquid (microcapsule liquids 1 to 6) was prepared.

—Production of Electrophoretic Display Device—

Onto a 100 μm-thick first polyethylene terephthalate (PET) film a surface of which was deposited thereon with ITO, the microcapsule liquid prepared as described above was coated so as to become a thickness of 150 μm using a doctor blade, and then dried for 12 hours. Thereafter, an ITO-deposited second PET film having a thickness of 100 μm and further having an adhesive having a thickness of 30 μm was laminated to the first PET film, thereby producing an electrophoretic display device (electrophoretic display devices 1 to 6).

Between the ITO surfaces facing each other, while a voltage of peak value of 10V by rectangle wave of 1 Hz was applied, white light was irradiated from a direction of 45° with respect to the PET film. A reflection density of a direction of 90° with respect to the PET film was measured under room temperature (about 25° C.) conditions.

As a result, in each of the electrophoretic display devices 1 to 6, the reflection density changed in accordance with the rectangular waive to be applied. When the applied voltage was −10V, the reflectance was 2% or less, and when the applied voltage was reversed to +10V, the reflectance was 48%. Therefore, the contrast ratio was 24. As a result, each of electrophoretic display devices 1 to 6 exhibited excellent display performances.

All publications, patent applications, and technical standards mentioned in this specification are herein incorporated by reference to the same extent as if each individual publication, patent application, or technical standard was specifically and individually indicated to be incorporated by reference.

What is claimed is:

1. An electrophoretic composition comprising a dye, a non-water-soluble dispersion medium, and charged particles, wherein the dye comprises in a molecule thereof at least two color forming moieties comprising a first color forming moiety and a second color forming moiety, the first color forming moiety having a maximum absorption wavelength that is the shortest maximum absorption wavelength among the at least two color forming moieties, the second color forming moiety having a maximum absorption wavelength that is the longest maximum absorption wavelength among the at least two color forming moieties, a difference between the maximum absorption wavelength of the first color forming moiety and the maximum absorption wavelength of the second color forming moiety being from 50 nm to 400 nm, and the first color forming moiety and the second color forming moiety being bonded through a covalent bond.

2. The electrophoretic composition according to claim 1, wherein the dye is a polymer dye that comprises at least a repeating unit comprising the first color forming moiety and a repeating unit comprising the second color forming moiety.

3. The electrophoretic composition according to claim 2, wherein the polymer dye further comprises a repeating unit derived from a non-water-soluble polymerizable compound, and a content of the repeating unit derived from the non-water-soluble polymerizable compound is from 5% by mass to 95% by mass of the polymer dye.

4. The electrophoretic composition according to claim 1, wherein the dye is a dye for green, the maximum absorption wavelength of the first color forming moiety of the dye for green is in a range of from 400 nm to 500 nm, and the maximum absorption wavelength of the second color forming moiety of the dye for green is in a range of from 600 nm to 700 nm.

5. The electrophoretic composition according to claim 4, wherein the first color forming moiety comprises at least one partial structure selected from the group consisting of partial structures represented by any of the following formulae (1) to (4), and the second color forming moiety comprises at least one partial structure that is different from the at least one partial structure of the first color forming moiety and that is selected from the group consisting of partial structures represented by any of the following formulae (1) to (4) and partial structures derived from a phthalocyanine derivative;

$Ar^1$—N═N—$Ar^2$  (1)

wherein, in formula (1), each of $Ar^1$ and $Ar^2$ independently represents an aromatic ring, and at least one hydrogen atom is removed from $Ar^1$, $Ar^2$, or both $Ar^1$ and $Ar^2$;

Formula (2)

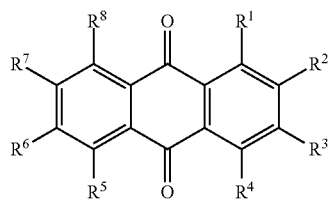

wherein, in formula (2), each of $R^1$ to $R^8$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^1$ to $R^8$;

Formula (3)

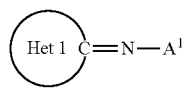

wherein, in formula (3), a ring structure comprising a carbon atom and represented by Het 1 represents an aromatic ring or a non-aromatic ring, $A^1$ represents an aromatic ring or a non-aromatic ring, and at least one hydrogen atom is removed from the ring structure, $A^1$, or both the ring structure and $A^1$;

Formula (4)

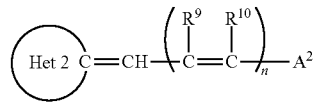

wherein, in formula (4), a ring structure comprising a carbon atom and represented by Het 2 represents an aromatic ring or a non-aromatic ring, $A^2$ represents an aromatic ring or a non-aromatic ring, each of $R^9$ and $R^{10}$ independently represents a hydrogen atom or an alkyl group, n represents 0, 1 or 2, and at least one hydrogen atom is removed from at least one moiety selected from the group consisting of the ring structure, $A^2$, $R^9$ and $R^{10}$.

6. The electrophoretic composition according to claim 5, wherein the first color forming moiety comprises at least one partial structure selected from the group consisting of partial structures represented by any of the formulae (1) and (4), and the second color forming moiety comprises at least one partial structure that is different from the at least one partial structure of the first color forming moiety and that is selected from the group consisting of partial structures represented by any of the formulae (3) and (4) and partial structures derived from a phthalocyanine derivative.

7. The electrophoretic composition according to claim 1, wherein, the dye is a dye for blue, the maximum absorption wavelength of the first color forming moiety of the dye for blue is in a range of from 500 nm to 575 nm, and the maximum absorption wavelength of the second color forming moiety of the dye for blue is in a range of from 625 nm to 700 nm.

8. The electrophoretic composition according to claim 7, wherein the first color forming moiety comprises at least one partial structure selected from the group consisting of partial structures represented by any of the following formulae (1) to (5), and the second color forming moiety comprises at least one partial structure that is different from the at least one partial structure of the first color forming moiety and that is selected from the group consisting of partial structures represented by any of the following formulae (1) to (4) and partial structures derived from a phthalocyanine derivative;

$Ar^1$—N═N—$Ar^2$  Formula (1)

wherein, in formula (1), each of $Ar^1$ and $Ar^2$ independently represents an aromatic ring, and at least one hydrogen atom is removed from $Ar^1$, $Ar^2$, or both $Ar^1$ and $Ar^2$;

Formula (2)

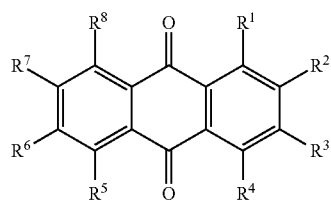

wherein, in formula (2), each of $R^1$ to $R^8$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^1$ to $R^8$;

Formula (3)

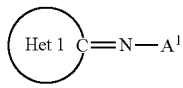

wherein, in formula (3), a ring structure comprising a carbon atom and represented by Het 1 represents an aromatic ring or a non-aromatic ring, $A^1$ represents an aromatic ring or a non-aromatic ring, and at least one hydrogen atom is removed from the ring structure, $A^1$, or both the ring structure and $A^1$;

Formula (4)

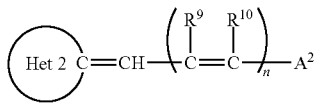

wherein, in formula (4), a ring structure comprising a carbon atom and represented by Het 2 represents an aromatic ring or a non-aromatic ring, $A^2$ represents an aromatic ring or a non-aromatic ring, each of $R^9$ and $R^{10}$ independently represents a hydrogen atom or an alkyl group, n represents 0, 1 or 2, and at least one hydrogen atom is removed from at least one moiety selected from the group consisting of the ring structure, $A^2$, $R^9$ and $R^{10}$;

Formula (5)

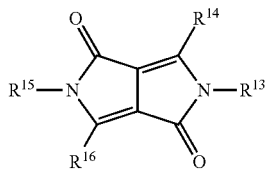

wherein, in formula (5), each of $R^{13}$ to $R^{16}$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^{13}$ to $R^{16}$.

9. The electrophoretic composition according to claim 8, wherein the first color forming moiety comprises at least one partial structure selected from the group consisting of partial structures represented by any of the formulae (1), (3) and (4), and the second color forming moiety comprises at least one partial structure that is different from the at least one partial structure of the first color forming moiety and that is selected from the group consisting of partial structures represented by any of the formulae (3) and (4) and partial structures derived from a phthalocyanine derivative.

10. The electrophoretic composition according to claim 1, wherein the dye is a dye for red, the maximum absorption wavelength of the first color forming moiety of the dye for red is in a range of from 400 nm to 475 nm, and the maximum absorption wavelength of the second color forming moiety of the dye for red is in a range of from 525 nm to 600 nm.

11. The electrophoretic composition according to claim 10, wherein the first color forming moiety comprises at least one partial structure selected from the group consisting of partial structures represented by any of the following formulae (1) to (4), and the second color forming moiety comprises at least one partial structure that is different from the at least one partial structure of the first color forming moiety and that is selected from the group consisting of partial structures represented by any of the following formulae (1) to (5) and partial structures derived from a phthalocyanine derivative;

$$Ar^1—N=N—Ar^2 \quad \text{Formula (1)}$$

wherein, in formula (1), each of $Ar^1$ and $Ar^2$ independently represents an aromatic ring, and at least one hydrogen atom is removed from $Ar^1$, $Ar^2$, or both $Ar^1$ and $Ar^2$;

Formula (2)

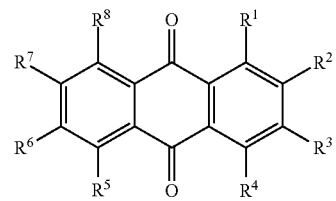

wherein, in formula (2), each of $R^1$ to $R^8$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^1$ to $R^8$;

Formula (3)

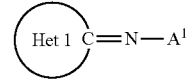

wherein, in formula (3), a ring structure comprising a carbon atom and represented by Het 1 represents an aromatic ring or a non-aromatic ring, $A^1$ represents an aromatic ring or a non-aromatic ring, and at least one hydrogen atom is removed from the ring structure, $A^1$, or both the ring structure and $A^1$;

Formula (4)

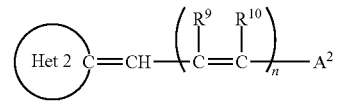

wherein, in formula (4), a ring structure comprising a carbon atom and represented by Het 2 represents an aromatic ring or a non-aromatic ring, $A^2$ represents an aromatic ring or a non-aromatic ring, each of $R^9$ and $R^{10}$ independently represents a hydrogen atom or an alkyl group, n represents 0, 1 or 2, and at least one hydrogen atom is removed from at least one moiety selected from the group consisting of the ring structure, $A^2$, $R^9$ and $R^{10}$;

Formula (5)

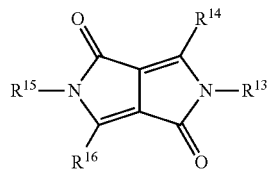

wherein, in formula (5), each of $R^{13}$ to $R^{16}$ independently represents a hydrogen atom, an alkyl group, an aryl group, an alkoxy group, an aryloxy group, an amino group, a hydroxyl group, a thiol group, an alkylthio group, an arylthio group, a carbonyl group, a sulfonic group, a carboxyl group, a halogen atom or a cyano group, and at least one hydrogen atom is removed from at least one moiety selected from the group consisting of $R^{13}$ to $R^{16}$.

12. The electrophoretic composition according to claim 11, wherein the first color forming moiety comprises at least one partial structure selected from the group consisting of partial structures represented by any of the formulae (1) and (4), and the second color forming moiety comprises at least one partial structure that is different from the at least one partial structure of the first color forming moiety and that is selected from the group consisting of partial structures represented by any of the formulae (1), (3) and (5).

13. The electrophoretic composition according to claim 1, wherein a ratio ($Abs_1$:$Abs_2$) of an absorbance $Abs_1$ at the maximum absorption wavelength of the first color forming moiety to an absorbance $Abs_2$ at the maximum absorption wavelength of the second color forming moiety is in a range of from 0.5:1 to 1:0.5.

14. The electrophoretic composition according to claim 2, wherein a ratio ($Abs_1$:$Abs_2$) of an absorbance $Abs_1$ at the maximum absorption wavelength of the first color forming moiety to an absorbance $Abs_2$ at the maximum absorption wavelength of the second color forming moiety is in a range of from 0.5:1 to 1:0.5.

15. The electrophoretic composition according to claim 1, wherein the covalent bond is formed by radical polymerization.

16. The electrophoretic composition according to claim 1, wherein the first color forming moiety and the second color forming moiety are bonded through at least one repeating structure selected from the group consisting of polyacrylate repeating structures, polymethacrylate repeating structures, polystyrene repeating structures, polyacrylamide repeating structures, polymethacrylamide repeating structures and polyvinyl ether repeating structures.

17. The electrophoretic composition according to claim 1, wherein the charged particles comprise titanium oxide particles, carbon black particles, or a mixture of titanium oxide particles and carbon black particles.

18. A microcapsule comprising the electrophoretic composition according to claim 1.

19. An electrophoretic display device comprising, in the following order, a first substrate having a first electrode, a microcapsule layer including the microcapsule according to claim 18, and a second substrate having a second electrode.

* * * * *